US008652308B2

(12) United States Patent
Aujollet

(10) Patent No.: US 8,652,308 B2
(45) Date of Patent: *Feb. 18, 2014

(54) HIGH-TEMPERATURE AND HIGH-PRESSURE ELECTROLYSER OF ALLOTHERMAL OPERATION

(75) Inventor: Patrick Aujollet, Pertuis (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 699 days.

This patent is subject to a terminal disclaimer.

(21) Appl. No.: 12/670,909

(22) PCT Filed: Jul. 31, 2008

(86) PCT No.: PCT/EP2008/060047
§ 371 (c)(1),
(2), (4) Date: Feb. 8, 2010

(87) PCT Pub. No.: WO2009/016226
PCT Pub. Date: Feb. 5, 2009

(65) Prior Publication Data
US 2010/0140102 A1   Jun. 10, 2010

(30) Foreign Application Priority Data
Aug. 2, 2007  (FR) ...................... 07 56903

(51) Int. Cl.
*C25B 9/10* (2006.01)
*C25B 1/04* (2006.01)

(52) U.S. Cl.
USPC ............................ 204/241; 204/274; 205/262

(58) Field of Classification Search
CPC ....................................................... C25B 1/10
USPC ............... 204/253, 257, 258, 241, 274; 205/628–632; 429/434, 435, 439, 442
See application file for complete search history.

(56) References Cited

U.S. PATENT DOCUMENTS

| 2,007,096 A |   | 7/1935 | Niederreither |
| 3,975,913 A | * | 8/1976 | Erickson ........................ 60/645 |
| 4,420,387 A |   | 12/1983 | Bergner et al. |
| 4,436,607 A | * | 3/1984 | Fischer ......................... 204/246 |

(Continued)

FOREIGN PATENT DOCUMENTS

| WO | WO 01/11112 A1 | 2/2001 |
| WO | WO 2004/113590 A2 | 12/2004 |

OTHER PUBLICATIONS

U.S. Appl. No. 12/671,219, filed Jan. 29, 2010, Aujollet.

(Continued)

*Primary Examiner* — Nicholas A Smith
*Assistant Examiner* — Ciel Thomas
(74) *Attorney, Agent, or Firm* — Oblon, Spivak, McClelland, Maier & Neustadt, L.L.P.

(57) ABSTRACT

An electrolyzer for high temperature electrolysis capable of operating in an allothermal mode including an enclosure, at least one electrolysis plate (8) including an anode and a cathode in combination and means for heating an active fluid intended to undergo a high temperature electrolysis, characterized in that the enclosure is capable of maintaining an electrolyte bath under high or very high pressure of several tens of bars, in that said heating means (10) are positioned in the enclosure and use a heat transfer fluid.

24 Claims, 19 Drawing Sheets

(56) References Cited

U.S. PATENT DOCUMENTS

Figure 1A:
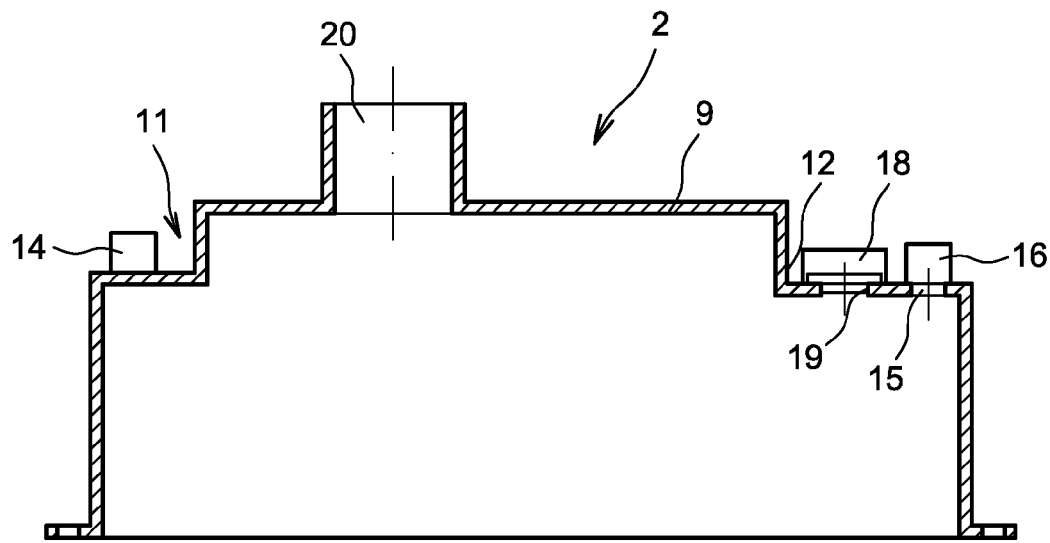

| | | | |
|---|---|---|---|
| 5,964,089 A | 10/1999 | Murphy et al. | |
| 5,977,785 A * | 11/1999 | Burward-Hoy | 324/750.09 |
| 6,254,741 B1 * | 7/2001 | Stuart et al. | 204/254 |
| 6,554,978 B1 * | 4/2003 | Vandenborre | 204/258 |
| 2002/0058175 A1 * | 5/2002 | Ruhl | 429/32 |
| 2004/0084325 A1 * | 5/2004 | Weinberg et al. | 205/628 |
| 2005/0087435 A1 * | 4/2005 | Kong et al. | 204/164 |
| 2005/0183962 A1 * | 8/2005 | Oakes | 205/340 |
| 2006/0237328 A1 * | 10/2006 | Foster | 205/637 |

OTHER PUBLICATIONS

Bengt Sunden, "High Temperature Heat Exchangers (HTHE)", Proceedings of the Fifth International Conference on Enchanced, Compact and Ultra-Compact Heat Exchangers: Science Engineering and technology, XP-002473777, Sep. 2005, pp. 226-238.

Youngjoon Shin, et al., "Evaluation of the high temperature electrolysis of steam to produce hydrogen", International Journal of Hydrogen Energy, vol. 32, No. 10-11, XP022117757, Jun. 7, 2007, pp. 1486-1491.

* cited by examiner

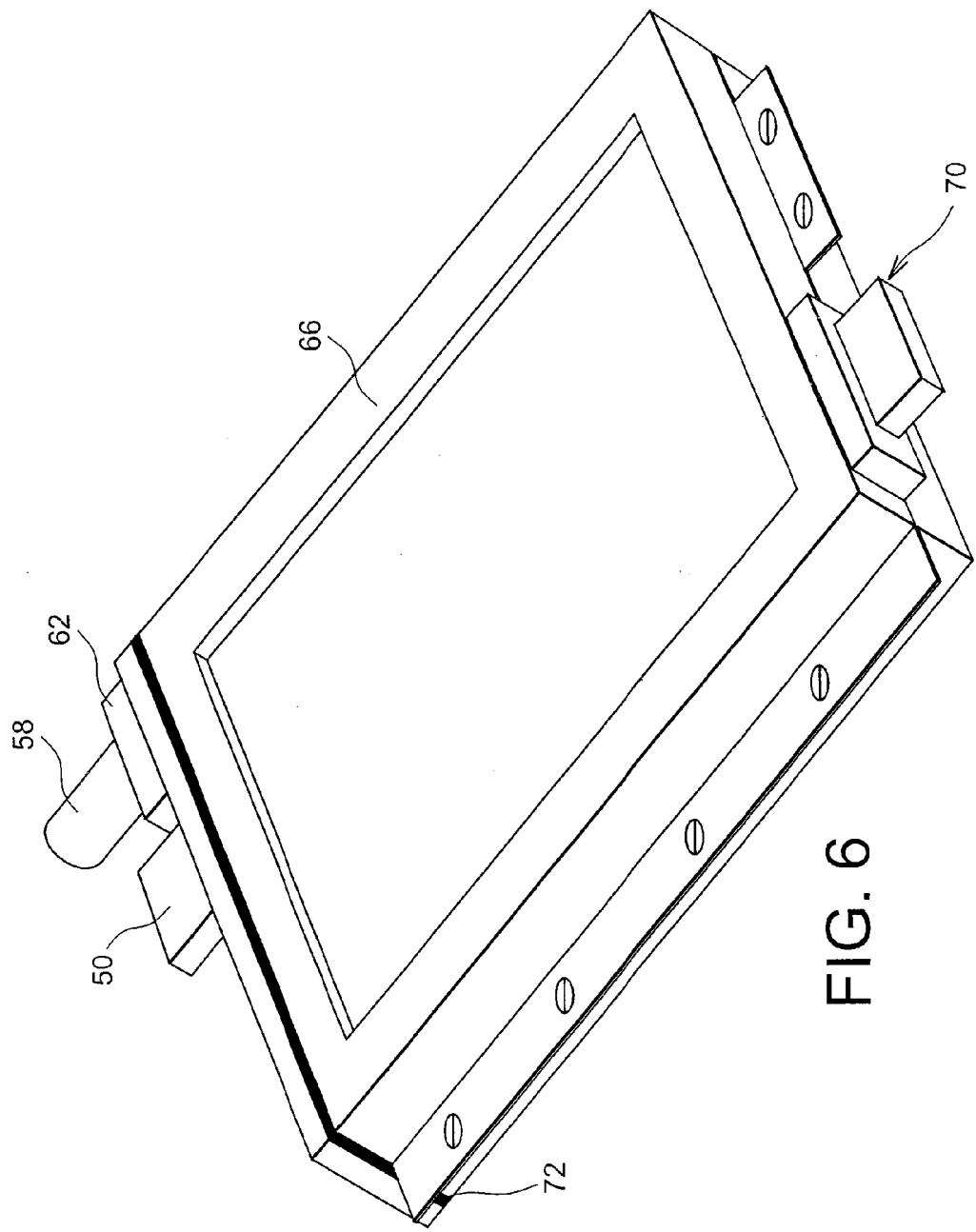

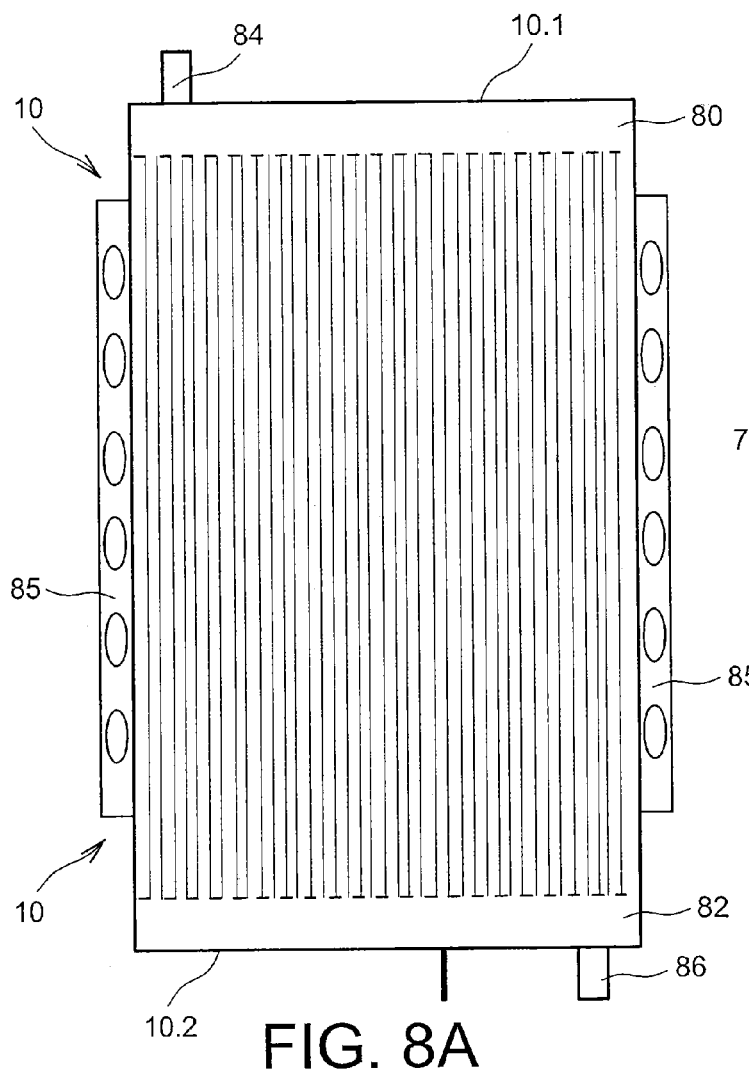
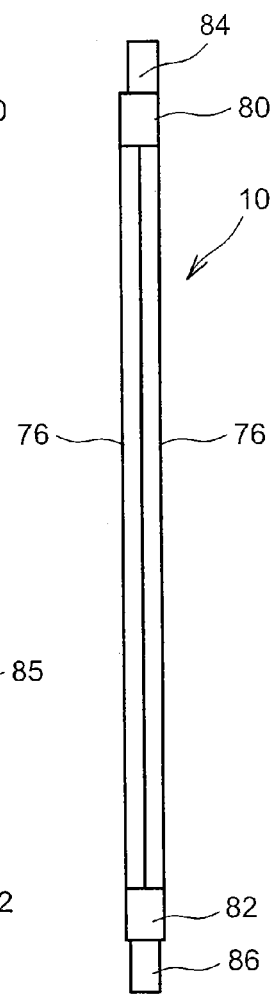
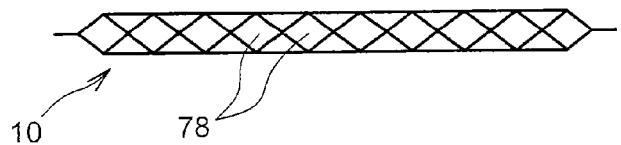
FIG. 8A
FIG. 8B
FIG. 8C

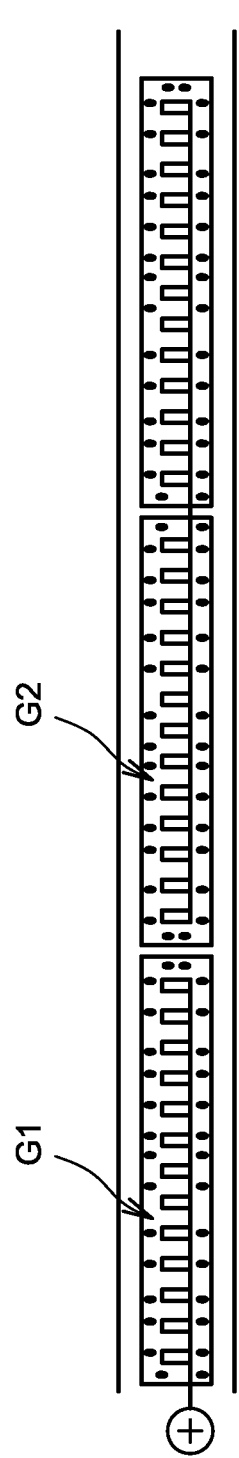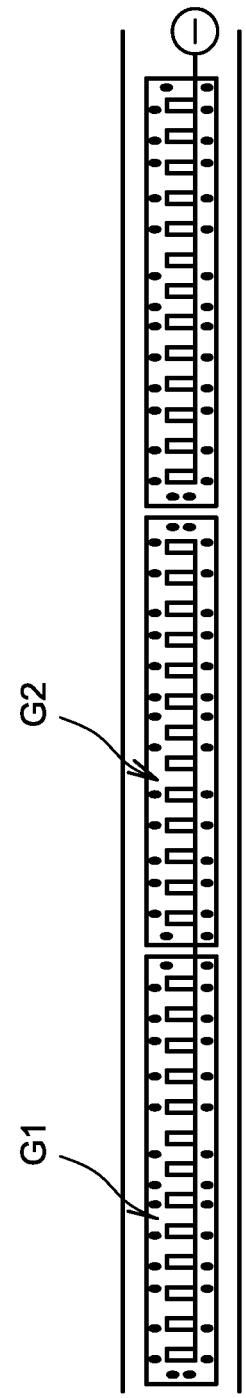

HIGH-TEMPERATURE AND HIGH-PRESSURE ELECTROLYSER OF ALLOTHERMAL OPERATION

TECHNICAL FIELD AND PRIOR ART

The invention relates to the field of endothermic electrolyses at a high temperature of the order of several hundred degrees Celsius for dissociating a reagent in liquid or vapor phase.

The present invention more specifically relates to a high temperature electrolyzer with allothermal operation, providing stable and homogeneous operating conditions.

In the following, for the clarity of the discussion, we shall take the case of electrolysis of water.

When setting up current at the terminals of an electrolyser, part of the energy supplied by the direct current source is converted into heat inside the different conductors and electric contacts, but also during transfer of ions through the electrolyte. All these dissipative phenomena contribute towards useless loss of electric energy, current technological developments focusing both on the limiting of these phenomena and on the duration of stable functioning of electrolysers.

Also, the energy input required for the decomposition reaction of the water molecule can be broken down into part electric energy and part heat. The maximum quantity of heat which can be absorbed by the water decomposition reaction increases with temperature.

Current experimental results show that below a temperature threshold in the order of 750° C. electrolysers can only have exothermal operation i.e. the heat generated by dissipative phenomena related to the establishing of electric current is equal to or more than the heat which can be consumed by the water electrolysis reaction. The excess heat must then be transmitted to a cold source.

Over and above this threshold temperature in the order of 750° C. which shall be designated the electrolyser endothermism threshold, electrolysers may have autothermal functioning i.e. all the energy required to decompose the water molecule i.e. work and heat, is provided by the electric current supplying the electrolysers.

Above this temperature threshold, theory and experimental results show that electrolysers may advantageously have endothermal functioning i.e. allothermal that is to say that part of the energy required for decomposing the water molecule is transmitted directly in the form of heat from an external heat source to the electrolyser.

Endothermal i.e. allothermal operation is preferable since it allows a reduction in the quantity of electric energy that needs to be supplied to the electrolyser to allow electrolysis.

A water-electrolyser is known called an alkaline electrolyser in which the electrolysis reaction is conducted in an alkaline liquid medium. The anode and cathode are separated by an ion membrane or diaphragm in which $OH^-$ ions circulate.

The reactions at the electrodes are written:

At the cathode: $2H_2O + 2e^- \rightarrow H_2 + 2OH^-$

At the anode: $2OH^- \rightarrow \frac{1}{2}O_2 + 2e^-$

This electrolyser operates at temperature values lower than the saturation value of the alkaline solution (from 80° C. to 90° C. under one bar and 130° C. to 160° C. under 30 bars).

The difference in potential to be maintained between the electrodes varies between 1.75 V and 2.05 V depending on the electric resistance values of the electrodes and membrane (resistance to passing of the $OH^-$ ion). These values are greater than the value of the theoretical difference in potential (in the order of 1.49 V at this temperature level) that is strictly necessary for the decomposition reaction of liquid water.

On account of dissipative thermal phenomena related to over-voltages activating chemical reactions and to the low conductivity values of the electrodes, of the alkaline solution and ion membrane, between 15% and 25% of the total electric energy supplied to the equipment will be lost in the form of heat transmitted to the cold source. The functioning of this electrolyser is therefore solely exothermal.

An electrolyser also exists having a proton membrane whose operation is exothermal, in which electrolysis is conducted in vapour phase. The anode and the cathode are separated by a proton membrane in which $H^+$ ions circulate. The reactions at the electrodes are written:

At the anode: $H_2O \rightarrow \frac{1}{2}O_2 + 2H^+ + 2e^-$

At the cathode: $2H^+ + 2e^- \rightarrow H_2$

The operating temperature of this type of electrolyzer is limited by the mechanical resistance of the polymer membrane, lying the range of [300-400° C.]

Electrolysers also exist which operate at very high temperatures, called electrolyte high temperature electrolysers, derived from Solid Oxide Fuel Cell terminology, which operate in autothermal mode. These electrolysers are currently at the experimental stage or are demonstration prototypes, and are supplied with water vapour or a vapour/hydrogen mixture at very high temperature, but they cannot operate under high pressure i.e. several tens of bars of water vapour or food-grade mixture.

The oxidation-reduction reactions at the electrodes are written:

At the anode, oxidation of the oxygen ions:

$$O^{2-} \rightarrow \frac{1}{2}O_2 + 2e^- \quad (I)$$

At the cathode, reduction of water vapour:

$$H_2O + 2e^- \rightarrow H_2 + O^{2-} \quad (II)$$

To arrive at the global reaction:

$$H_2O \rightarrow H_2 + \frac{1}{2}O_2$$

The superheated water vapour arrives at the cathode. At the reaction sites, it is reduced to form hydrogen and $O^{2-}$ ions. The water vapour becomes enriched with hydrogen whilst the $O^{2-}$ ions migrate through the membrane under the effect of the electric field. At the anode, ions release their electrons to form oxygen molecules.

The electrode materials commonly used are of metal ceramic type deposited on a metallic bipolar plate, and the electrolyte material is of ion-conductive ceramic type. These ceramic materials have electric and ionic resistivity values which decrease with temperature, which tends to reduce the quantity of heat generated by passing of the electric current, with the increase in operating temperature.

The design of electrolysers currently being developed, in which the outflow of the water vapour/hydrogen mixture under pressure takes place in a cavity formed by the electrodes in ceramic material surrounded by air at atmospheric pressure, does not at the present time allow this type of electrolyser to operate at high pressure i.e. several tens of bars of gas mixture.

On the other hand, a decrease in the quantity of heat generated by dissipative phenomena and the changing thermodynamic characteristics of the water decomposition reaction with temperature value, mean that this type of electrolyser is able to operate endothermally, but in this case this requires maintaining the water vapour at a temperature higher than the endothermism threshold throughout the entire electrolyser.

There are currently two solutions to provide the heat required for functioning of an electrolyser in endothermal mode.

The first solution consists of providing this energy by direct heating of the water vapour to be decomposed by means of a heat exchanger positioned upstream of the electrolyser. However, simulation thermal calculations of an electrolyser functioning endothermally show:

that, to maintain good conditions for endothermal functioning i.e. a temperature higher than the endothermism threshold in the entire electrolyser, it is necessary to have strong superheating and a high flow rate of the water vapour on entering the electrolyser which, having regard to the required temperature (over 1100° C. in this case) will greatly increase the costs of the boiler and of the entire installation, that this solution is not the best indicated to provide stable, homogeneous temperature conditions for electrolyser operation, unless the food-grade water vapour is supplied at high mass flow rates.

This translates as very large capacity packaging and re-circulation installations when the water vapour pressure tolerated by the installations, in particular the electrolyser, cannot exceed a few bars. This also translates as high flow rates, hence head losses, in the exchanger, electrolyser and piping, which will impact energy costs for compression equipment.

The second solution consists of providing the necessary heat by means of a hot heat-transfer gas mixed with water vapour or water vapour/hydrogen mixture entering the electrolyser, this solution requiring additional equipment to separate the chemical bodies downstream of the electrolyser in order to collect the heat-transfer gas, which causes losses of heat-transfer gas. It also requires a high mass flow of heat-transfer gas under low pressure, leading to limited performance i.e. gas head losses through the electrolyser and limited electrolyser power.

Document WO2004/113590 describes a device to carry out alkaline electrolysis which takes place in liquid phase only, which limits the operating temperature to values below the critical temperature of water which is 374° C. Therefore, it is not possible with this device to operate in a temperature range allowing reversible voltages values to be achieved in endothermal mode. To reach sufficiently low reversible voltage values at said temperature for operation in endothermal mode, very low pressure values must be reached largely lower than 1 bar, which prevents any application to large or medium-size installations. It is effectively not possible to design piping and compression stages that can avoid too great head losses at such low pressure levels.

Therefore currently known solutions do not allow an efficient reduction in the consumption of energy to be supplied to an electrolyser, since significant overheating is required.

Further, with these electrolyzers, it is not possible to ensure a homogeneous temperature within the electrolyzer. Now, in order to obtain a homogeneous operation of the electrolyzer, which is one of the service life conditions of the components and of the conditions for performance of the electrolyzer, it is sought to limit the changes in temperature actually within the electrolyzer.

Therefore an object of the present invention is to provide an electrolyzer capable of operating in an endothermic way with optimized energy consumption and stable and homogeneous temperature operation.

An object of the present invention is also to provide a high temperature and high pressure electrolyzer, for which electric energy consumption is reduced.

DESCRIPTION OF THE INVENTION

The object stated earlier is achieved by an electrolyzer including an integrated heating system. Thus, the electrolyte bath is directly heated in the electrolyzer, which allows limitation of the heat loss and a substantially stable and homogeneous temperature may be provided in the whole bath.

In other words, heating is directly carried out in the box of the electrolyzer, which simplifies the device and makes the energy supply more efficient.

By integrating the heating, it is possible to provide the electrolyzer with the amount of heat required for its operation, since the latter is no longer provided by the Joule effect when operating in an endothermic mode with reduced irreversibility terms.

By applying heating integrated to the electrolyzer, the temperature of all the electrolysis cells may be maintained, with a change in temperature of less than 30° C. between the inlet and the outlet of the electrolyzer and overheating of the hot source by less than 50° C. relatively to the operating temperature of the electrolyzer.

In an advantageous embodiment, the electrolyzer according to the invention integrates a heating system by heat exchanges with a heat transfer fluid from a hot source.

The heating system advantageously includes a heat transfer fluid brought to a high temperature by an outer heat source, for example of the boiler or heat exchanger type.

Moreover, the electrolyzer according to the present invention includes a metal confinement with which the electrolyte bath may be maintained under a high or very high pressure of several tens of bars.

The pressure of the electrolyte bath then depends on the pressure level for which the metal box of the electrolyzer is dimensioned. The other mechanical members, notably the electrolysis plates, are then subject to much smaller mechanical stresses and work in compression since the formed gases which they contain are at a lower pressure than the gas in which they are immersed.

In a particularly advantageous exemplary embodiment, the heating system includes plates inserted between electrodes, also in the form of a plate.

According to an embodiment of the present invention, provision is therefore made for producing an electrolyzer using a large number of elementary cells of small dimensions mounted in series, which allows limitation of the intensity of the electric current flowing through the different elements of the electrolyzer and therefore limitation of the electric power dissipated as heat. Indeed, with the mounting in series, it is possible to only require an intensity equal to the one required for one plate, moreover, as the plate is of reduced size, the value of the intensity is low.

The heat transfer fluid may be in the liquid phase, i.e. molten metal or salt or in a gas phase. A preferred embodiment will be to bring the heat transfer gas to high pressure and to dimension the heating plates for this purpose.

The design of the cells and their arrangement in a pressurized enclosure allow the cathode-electrolyte-anode assemblies to not withstand the forces related to the pressure differences between the flowing gases. The forces due to the pressure differences between water vapour and the produced gases or between water vapour and the heat transfer fluid or between water vapour and the outside world are withstood by the internal members of the tank, like the uprights of the metal frames, and the shell of the heat exchanger for the heat transfer liquid, and by the enclosure of the electrolyzer.

Therefore, the cathode-electrolyte-anode assemblies may be optimized in order to provide reduced electric resistance by reducing their thickness, ion resistance and resistance to gas diffusion in the reduced electrodes by increasing their porosity, while allowing operation at a high pressure level in the enclosure of the electrolyzer.

The subject-matter of the present invention is then mainly an electrolyzer for high temperature electrolysis capable of operating in an endothermic mode including at least one anode and one cathode in combination and means for heating an active fluid intended to undergo high temperature electrolysis, said heating means being integrated to the electrolyzer. Thus the heating is more efficient and more homogeneous in the electrolyzer.

Preferably, the heating means use a heat transfer fluid, for example heated by a conventional boiler with fossil fuel or with biomass or by a nuclear boiler at a very high temperature or by solar energy; in this way resorting to electric energy is reduced.

The subject-matter of the present invention is then mainly an electrolyzer for high temperature electrolysis capable of operating in an allothermal mode including an enclosure, at least one electrolysis plate including an anode and cathode in combination and means for heating an active fluid intended to undergo high temperature electrolysis, characterized in that the enclosure is capable of maintaining an electrolyte bath under high or very high pressure of several tens of bars, in that said heating means are arranged in the enclosure and use a heat transfer fluid.

The active fluid is advantageously a gas.

The heat transfer fluid may be a gas under high pressure, for example helium. It may also be molten metal, for example zinc, or molten salts, with which pressure drops may be reduced.

The enclosure for example includes a lower chamber, a middle box, an upper chamber.

The electrolysis plate for example includes a central body formed by an electrically conducting core as a plate, covered on its two faces by the anode, itself covered with an electrolyte, itself covered by the cathode and an electrically conducting frame surrounding the central body and exerting a compressive force on the layers forming the central body. With the frame, it is possible to stiffen the electrolysis plate and to improve contact between the layers.

An anode pin is connected to the core in order to connect the anode to a source of electric current and the cathode is electrically connected to the frame itself bearing a cathode pin, the anode pin and the cathode pin being positioned at ends opposite to each other of the electrolysis plate. This arrangement of the anode and cathode pins is able to facilitate a connection in series.

The electrolyzer advantageously includes at least one channel made in the anode and a collecting end piece connected to this channel in order to bring the gas(es) produced at the anode to the outside of the electrolyzer, the pressure of the gas(es) produced at the anode being less than that of the electrolyte bath at the cathode, the anode, the electrolyte and the cathode being thereby pressed against each other. The electrolyzer may then include channels formed by grooves made in the core, and reservoirs, one of the reservoirs being connected to the end piece for collecting the gas(es), connected to a main manifold.

The heating plate advantageously has substantially the same size as the electrolysis plate and may include a metal casing in which a heat exchange body is positioned, including a plurality of channels extending between an end supplied with hot heat transfer fluid and an end connected to a cold heat transfer fluid manifold.

The electrolyzer according to the invention includes a plurality of electrolysis plates and heating plates, the electrolysis plates being positioned between two heating plates.

In an embodiment, the electrolysis plates are electrically connected in series, the adjacent electrolysis plates being mounted in the enclosure so that the anode pin of an electrolysis plate passes through the lower chamber and the anode pin of the adjacent plate passes through the upper anode chamber which allows limitation of the required amount of supply current.

In another embodiment, the electrolysis plates are all connected in parallel.

In an alternative, they are distributed in groups electrically connected in parallel, the groups being connected together in series, the electrolysis plates of a same group being mounted in the box so that all the anode pins of these plates pass through the same lower or upper chamber, two adjacent groups having their anode pins not passing through the same chamber, which allows adaptation of the electrolyzer to the electric power supply.

The electrolysis plates are for example mounted in the enclosure by means of slides made on the middle box, electric insulating means being provided between the plates and the slides, and in which the heating plates are also mounted in slides provided on the middle box.

The upper and lower chambers include apertures for letting through end pieces for heat transfer fluid, for collecting the gas produced at the anode, and anode and cathode pins and a main passage for the active fluid, which allows fluidic and electric connections to be made outside the electrolyzer.

The apertures for letting through the anode and cathode pins are advantageously covered by a channel for cooling electric connections, which allows improvement of the electric conductivity of the connections.

The apertures for letting through the anode and cathode pins are advantageously made in a recess of the upper and lower chambers in order to reduce the length of the electric conductors.

Provision may be made for arranging a connecting plate around the anode and/or cathode pins on the upper chamber outside the latter and a connecting plate around the anode and/or cathode pins on the lower chamber outside the latter.

The subject-matter of the present invention is also an installation for producing gas by electrolysis including:
at least one electrolyzer according to the present invention,
an electric power supply with a given voltage,
wherein the electrolysis plates are grouped in several groups, the electrolysis plates being connected in series inside a same group and the groups being connected in parallel, the number of electrolysis plates of each group being selected so that the voltage of each group of electrolysis plates is close to the given voltage of the electric power supply.

With this configuration, it is possible not to use a transformer at the output of the electric power supply.

The subject-matter of the present invention is also a method for producing at least one gas by electrolysis applying an electrolyzer according to the present invention, wherein the pressure of the electrolysis bath is substantially equal to its usual storage and/or distribution pressure of said gas, for example between 30 bars and 130 bars.

The ratio between the molar flow rate of water vapour and the molar flow rate of produced dihydrogen advantageously has a value from 2 to 5, with which high dihydrogen vapor pressure may be obtained at the outlet of the electrolyzer, while ensuring a sufficient layer of water on the electrolysis plates.

SHORT DESCRIPTION OF THE DRAWINGS

Figure 1B:
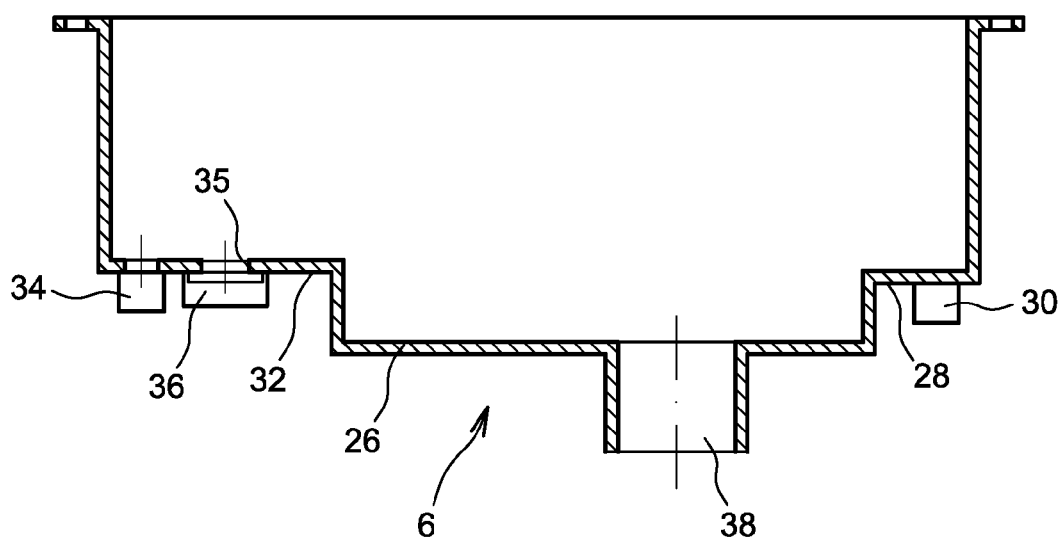
Figure 2A:
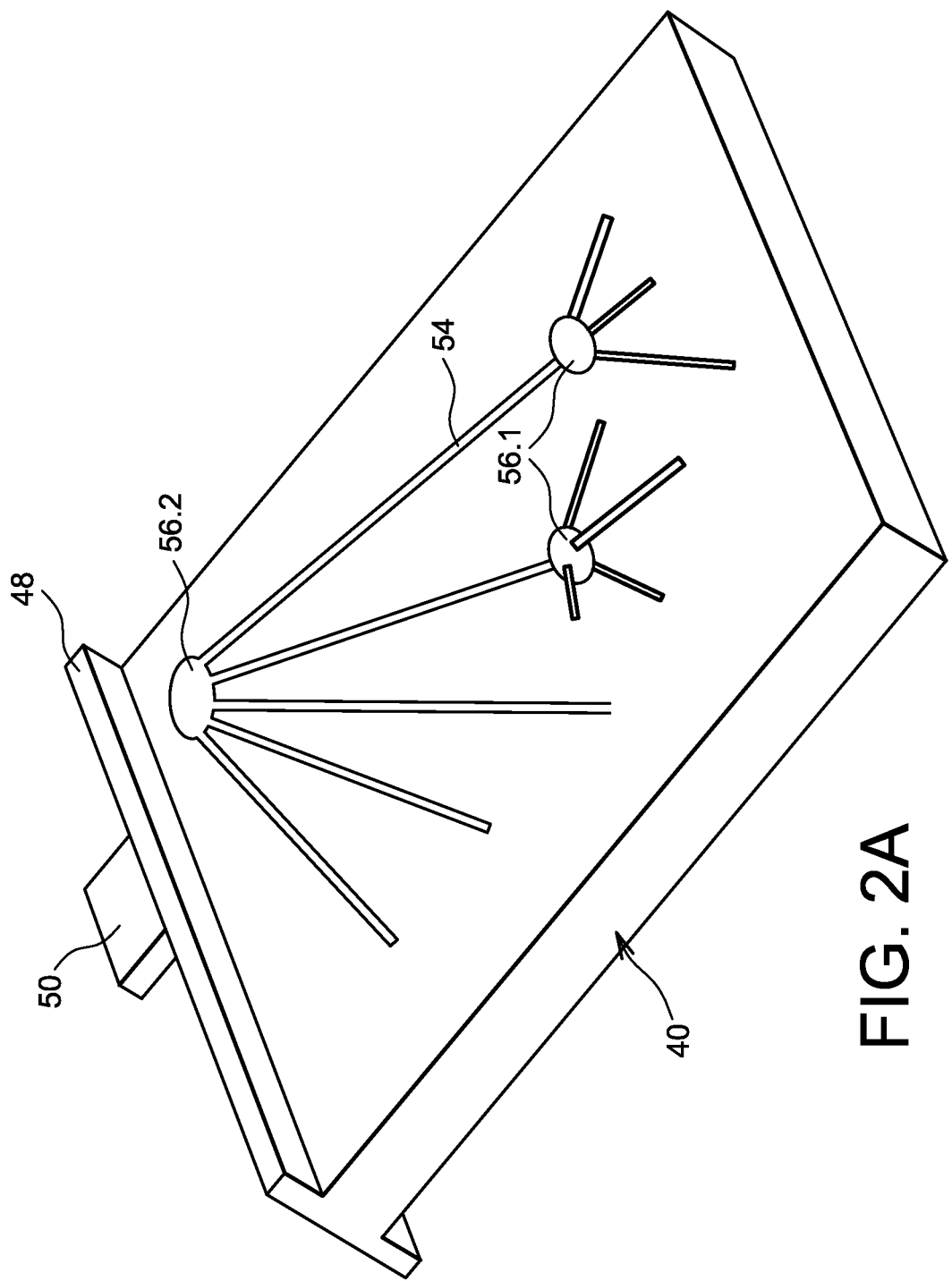
Figure 2B:
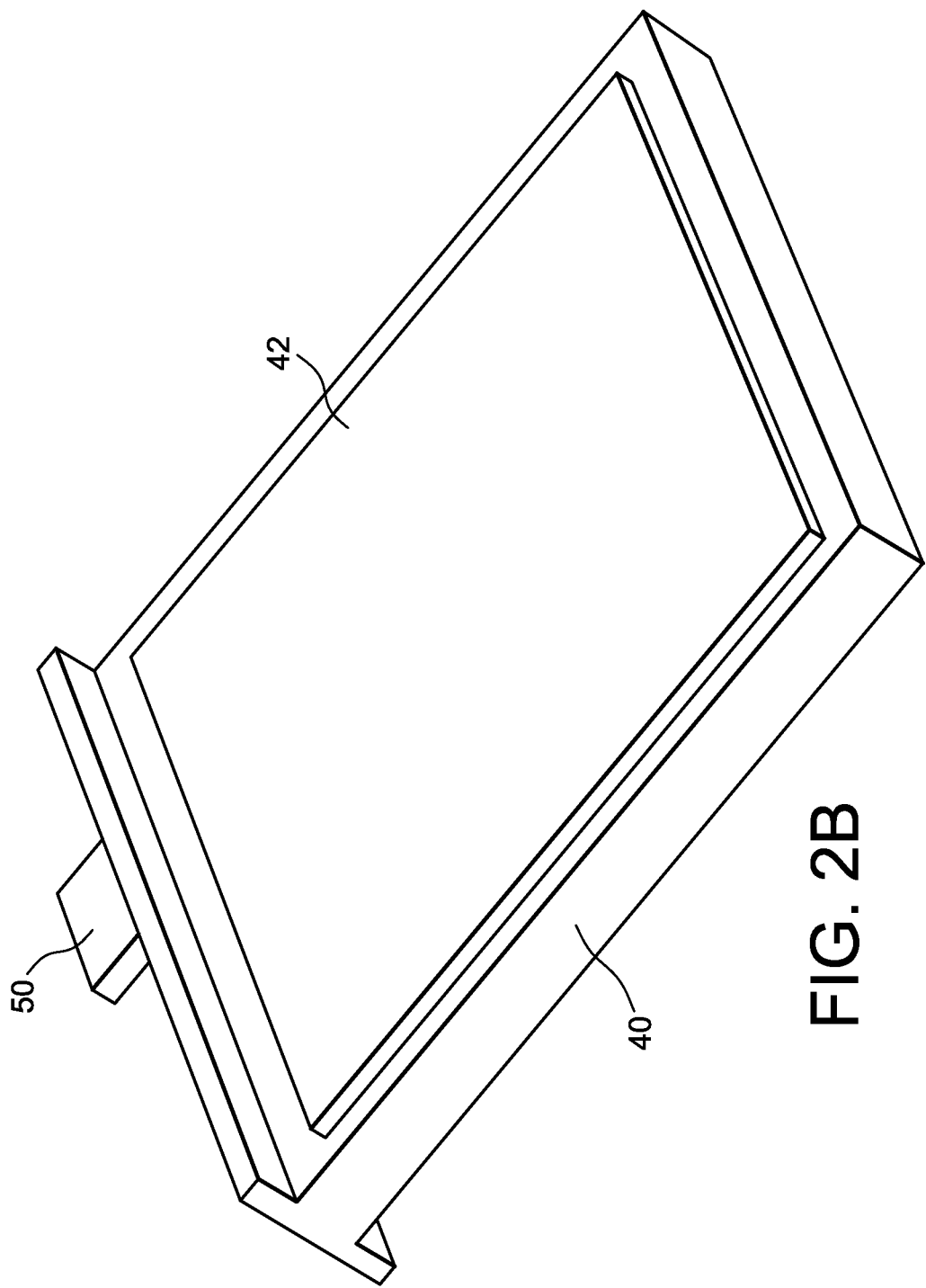
Figure 3:
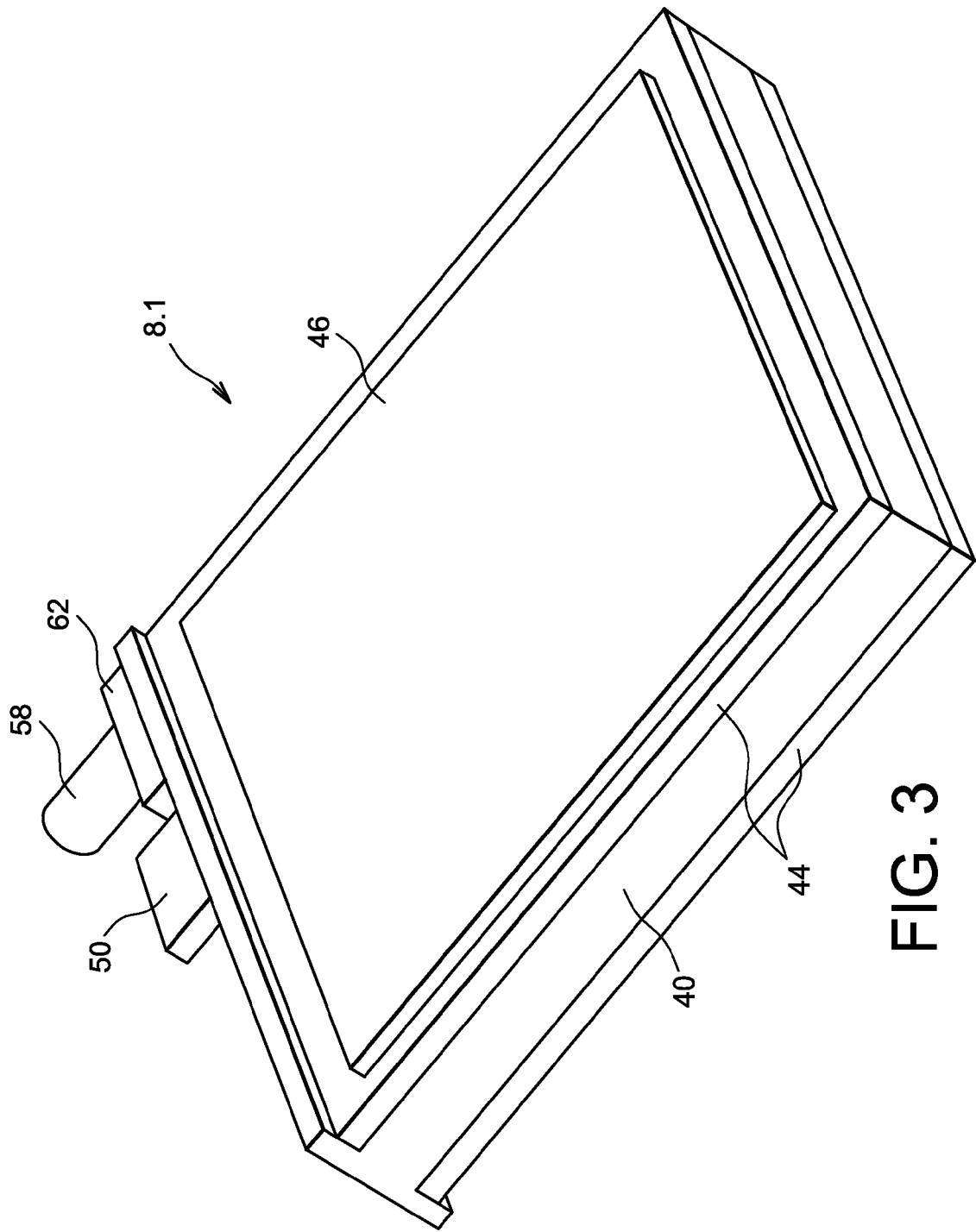
Figure 4:
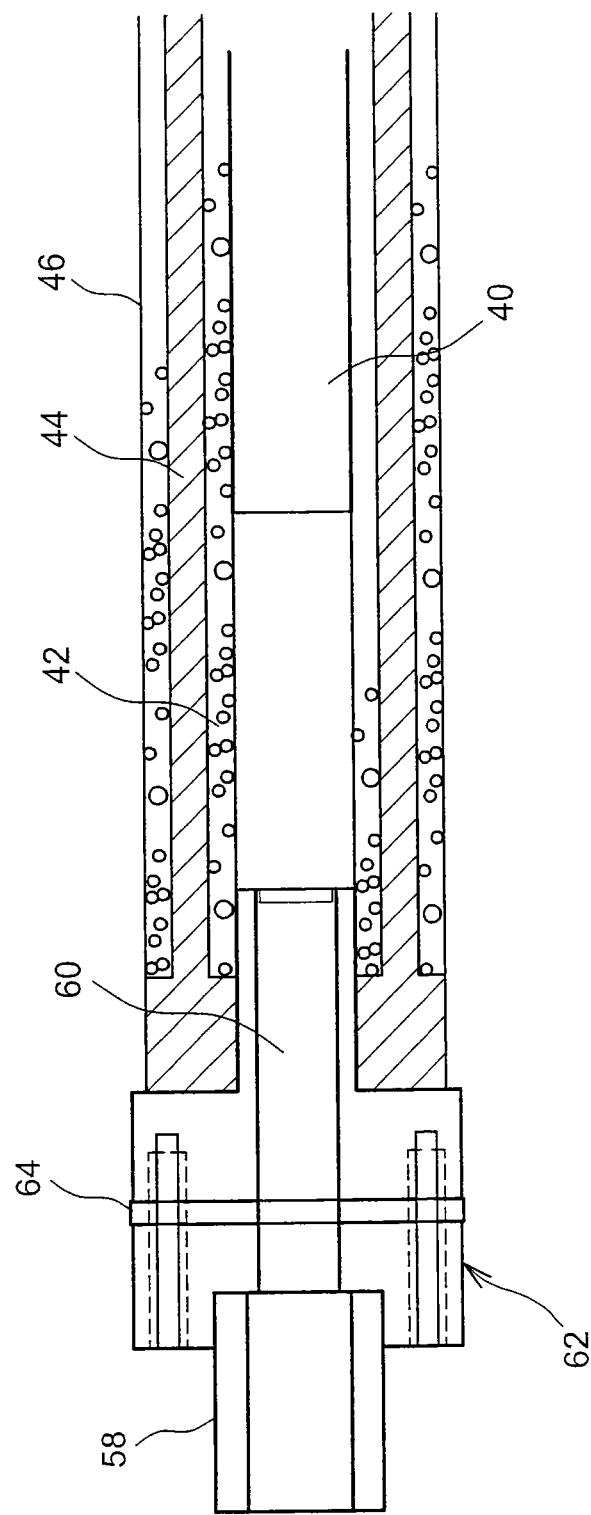
Figure 5:
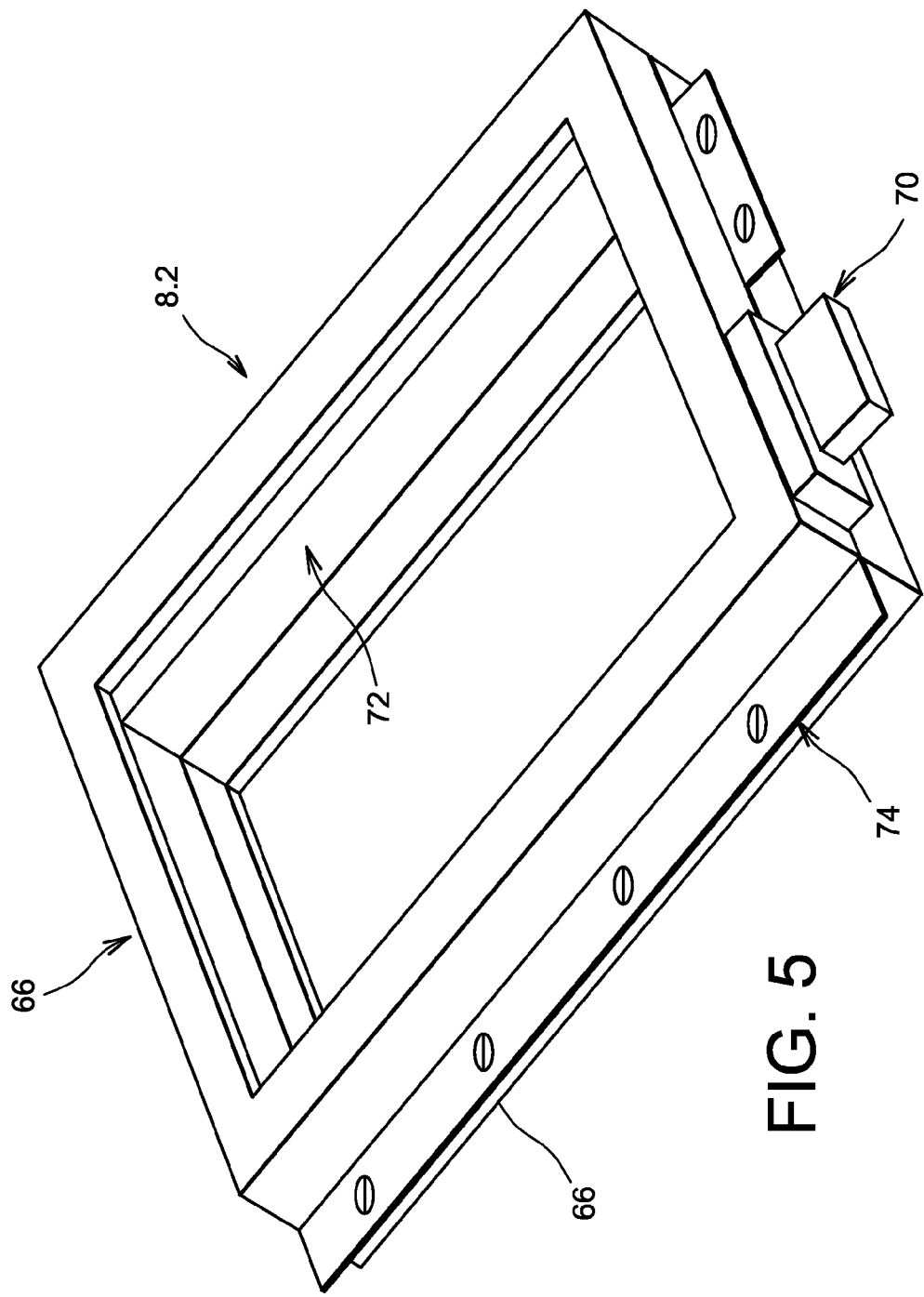
Figure 7A:
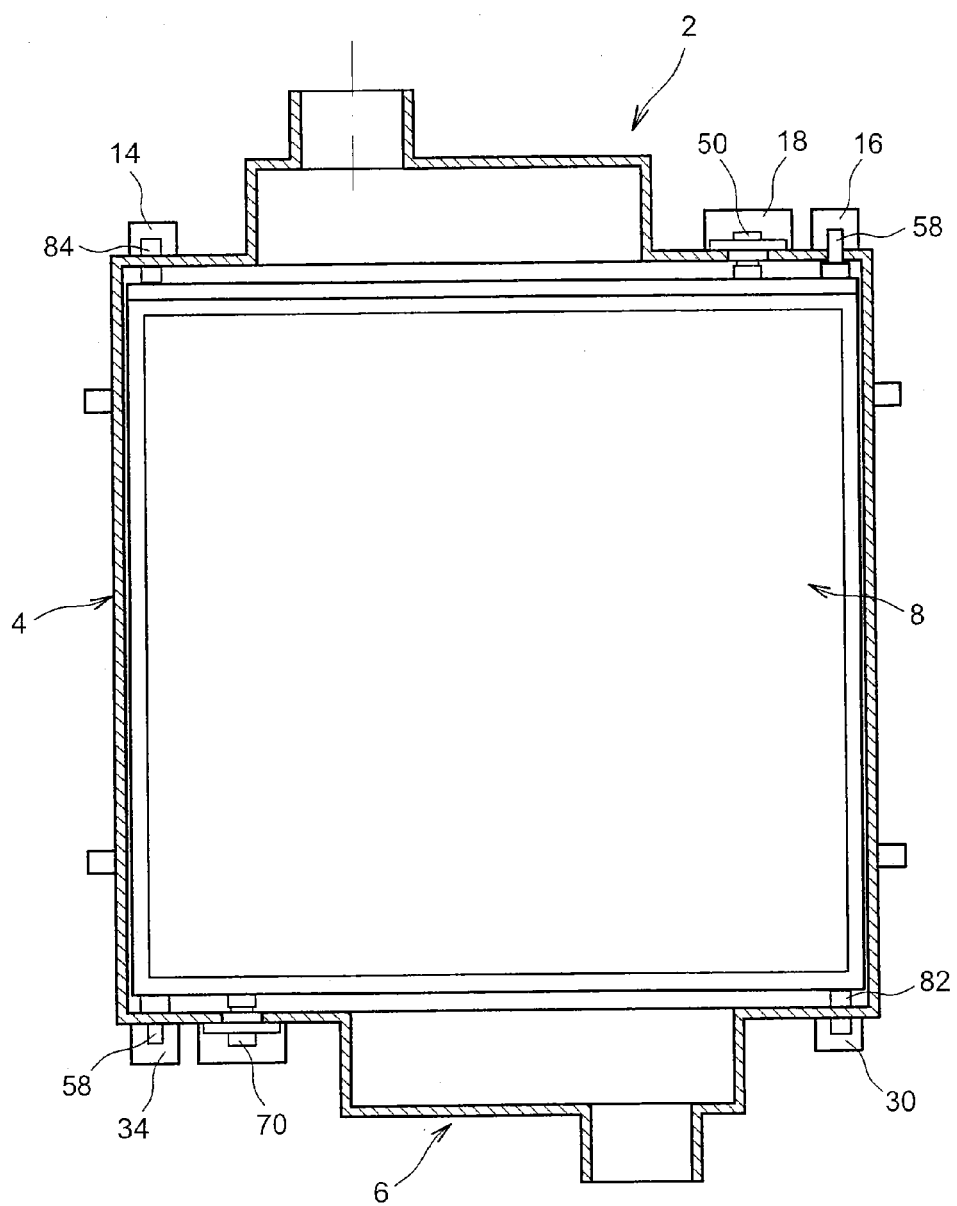
Figure 7B:
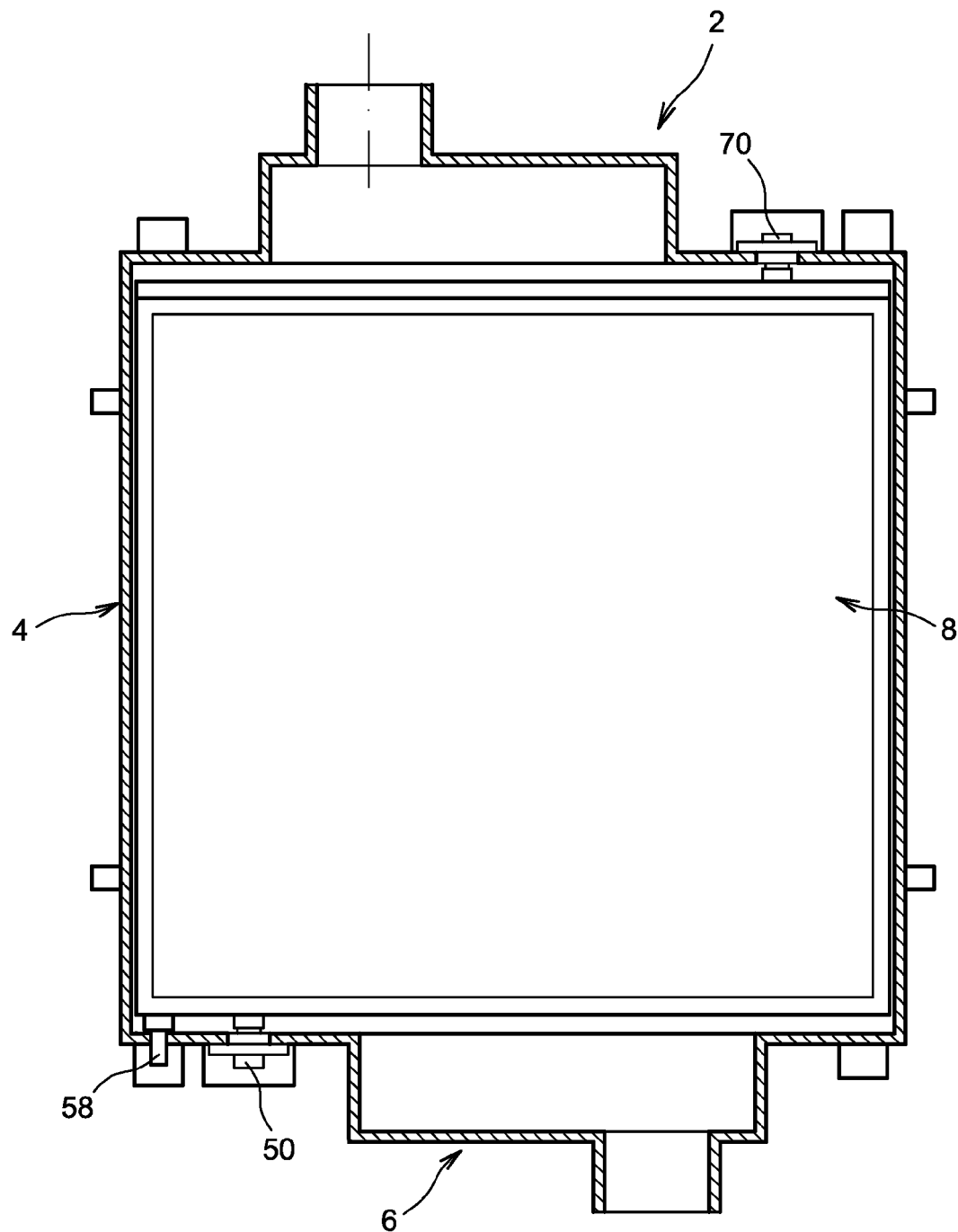
Figure 9:
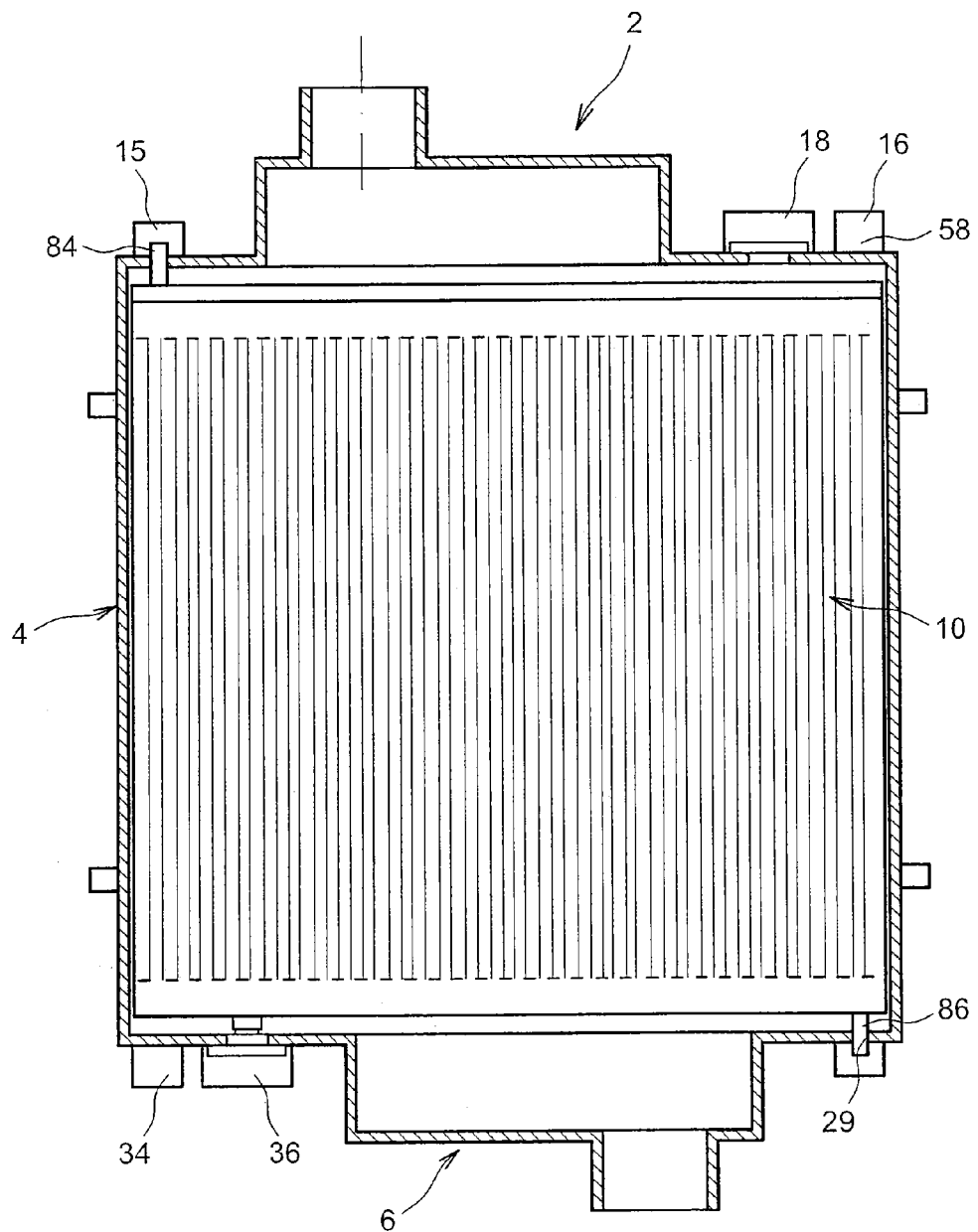
Figure 10:
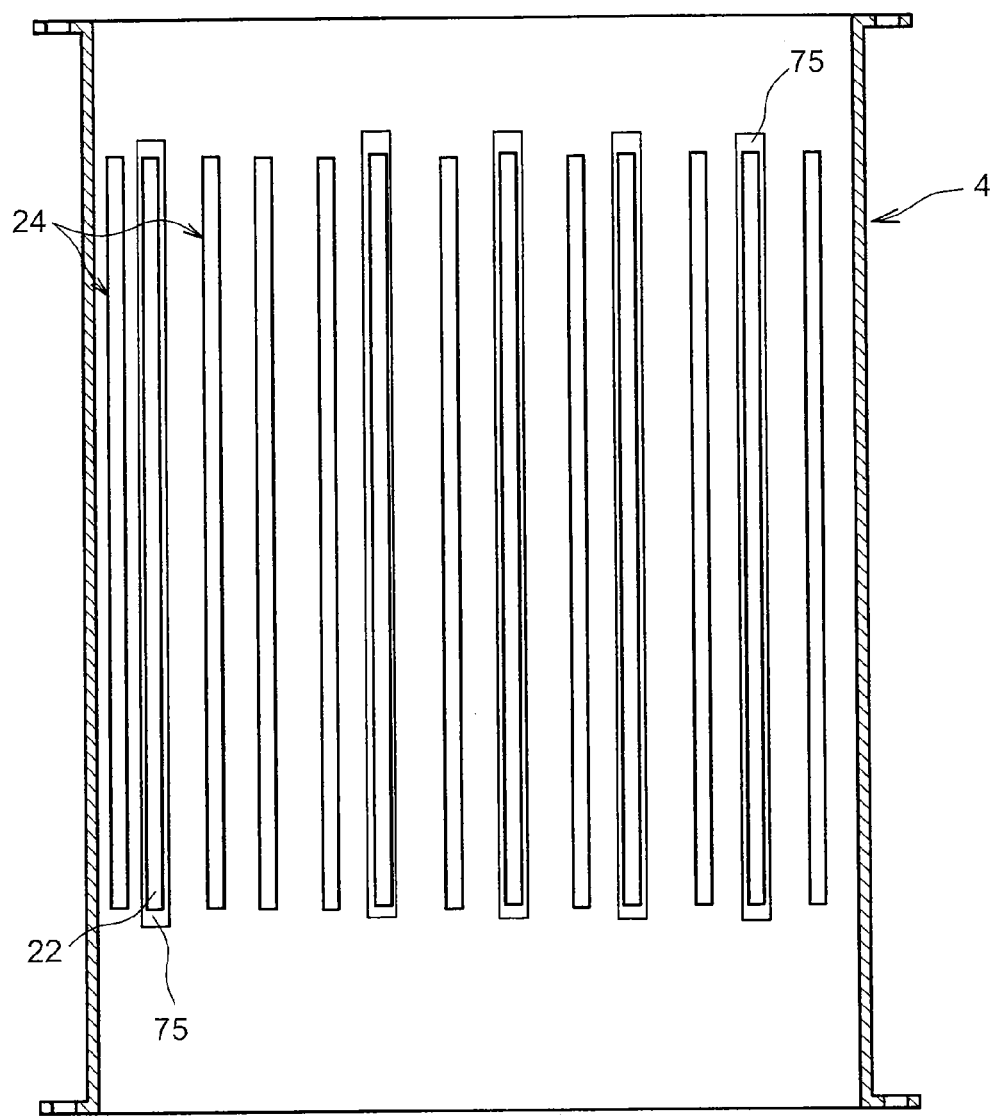
Figure 11:
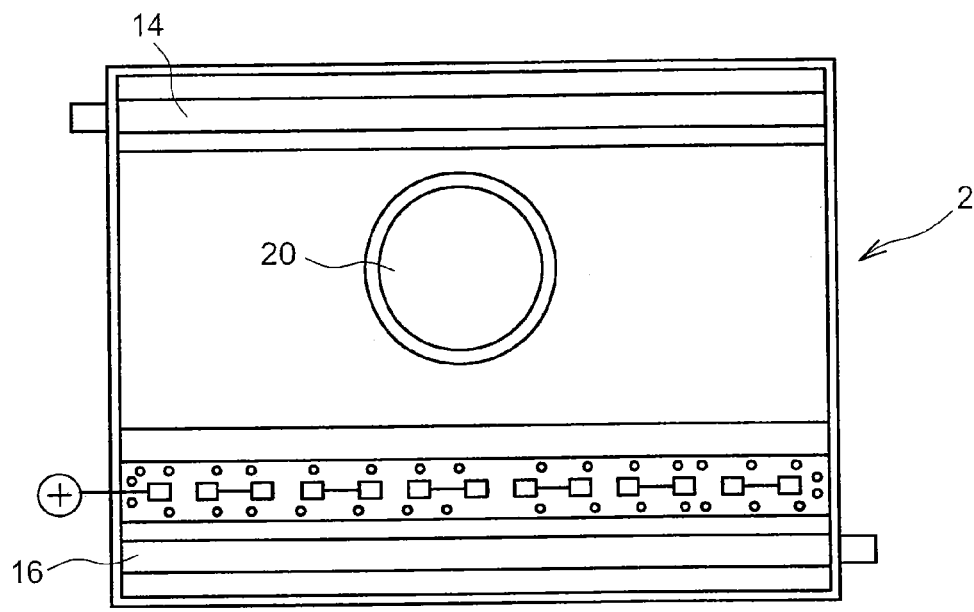
Figure 12A:
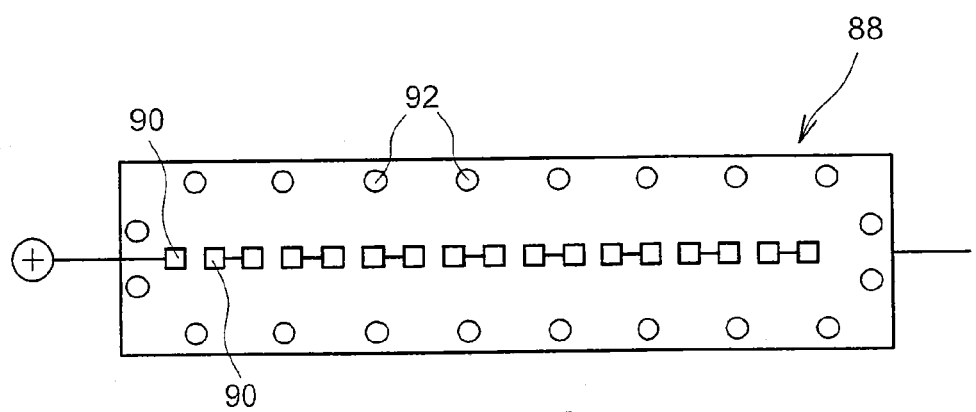
Figure 12B:
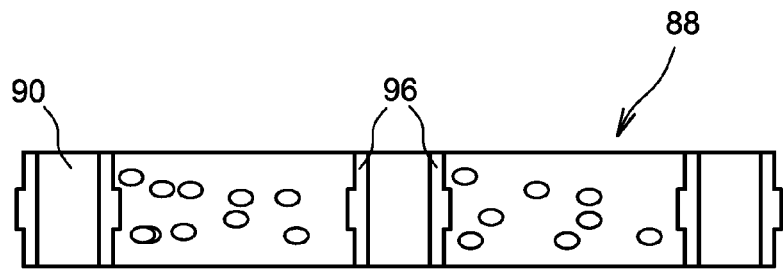
Figure 12C:
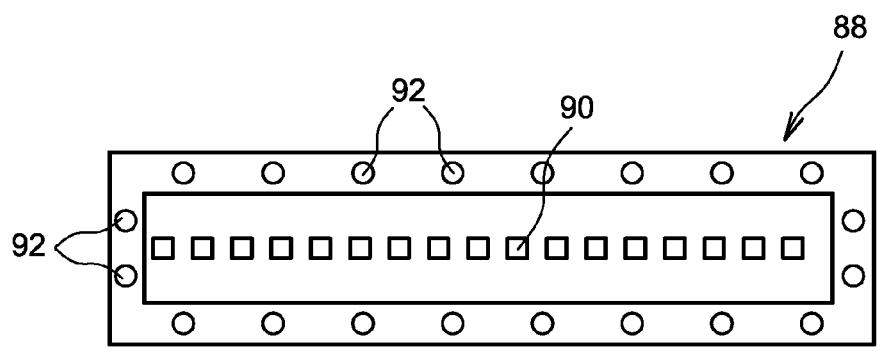
Figure 13:
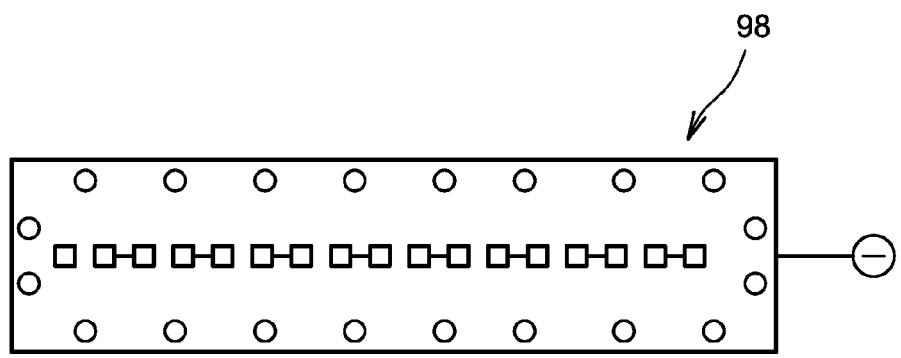
Figure 15:
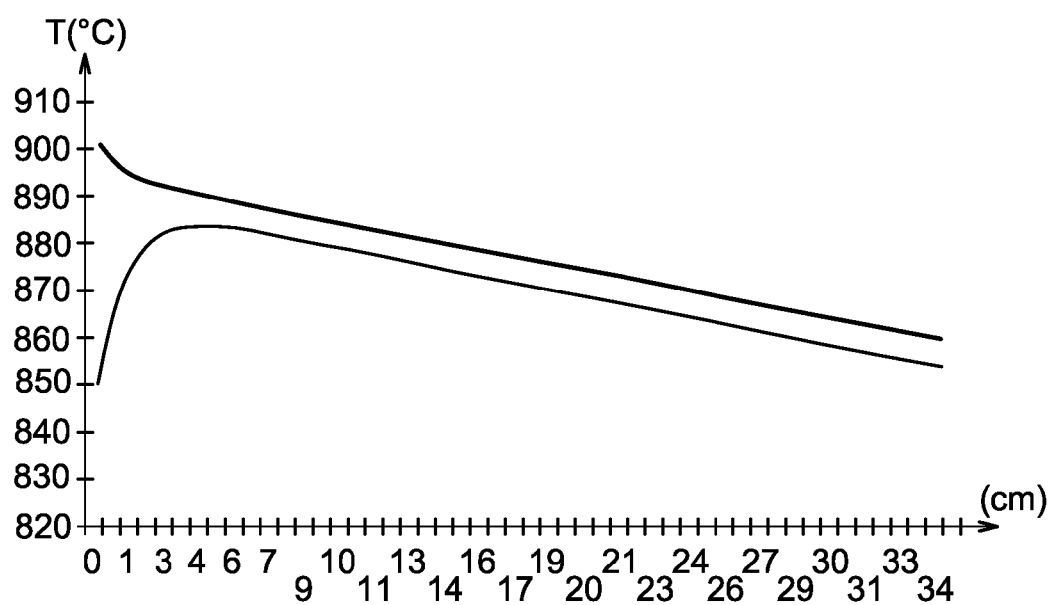
Figure 16A:
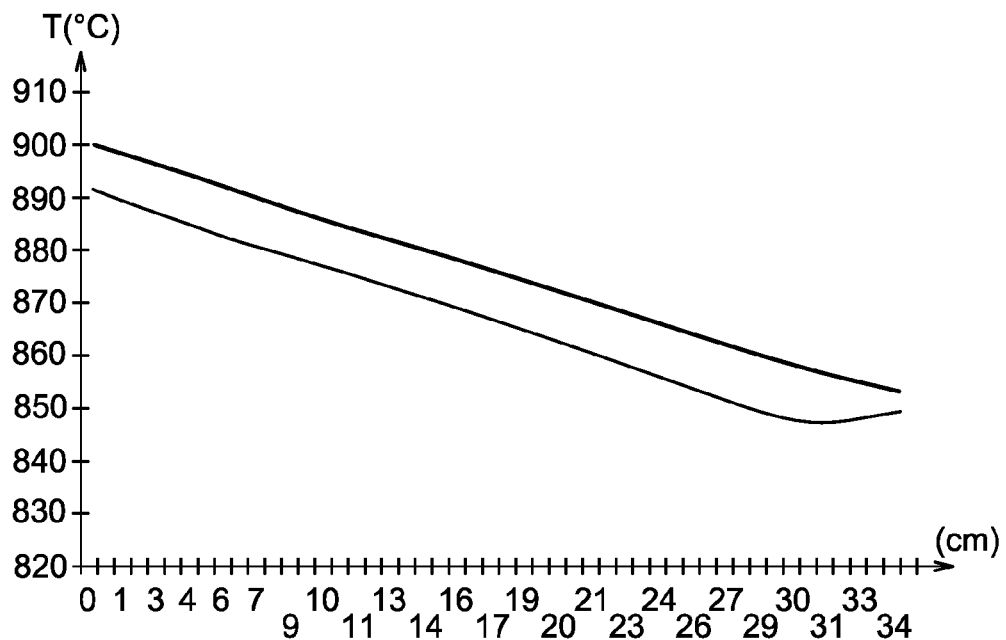
Figure 16B:
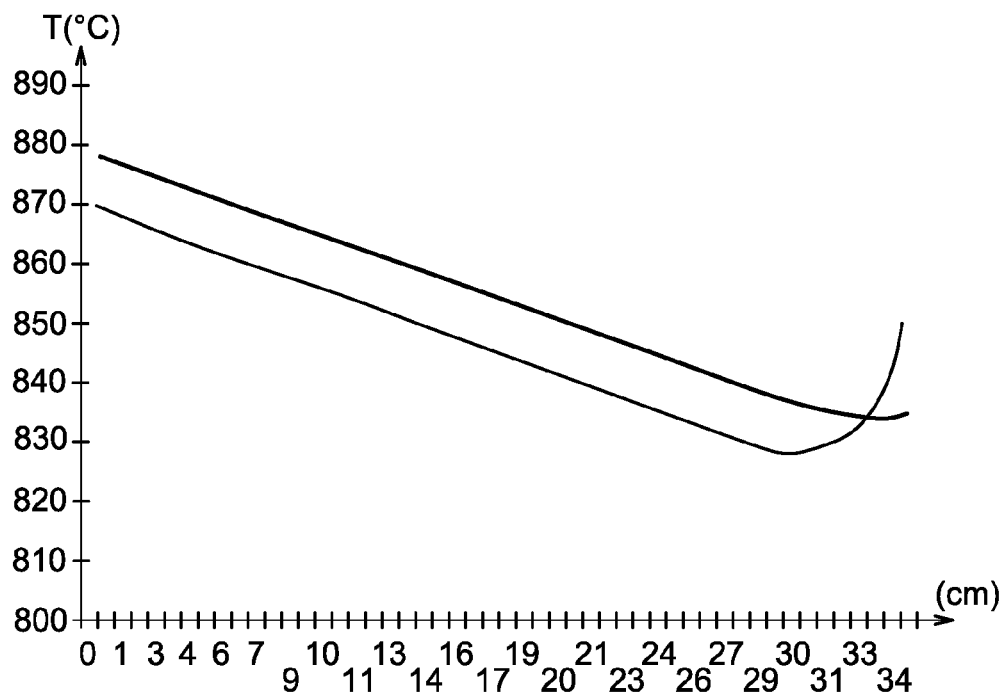
Figure 17:
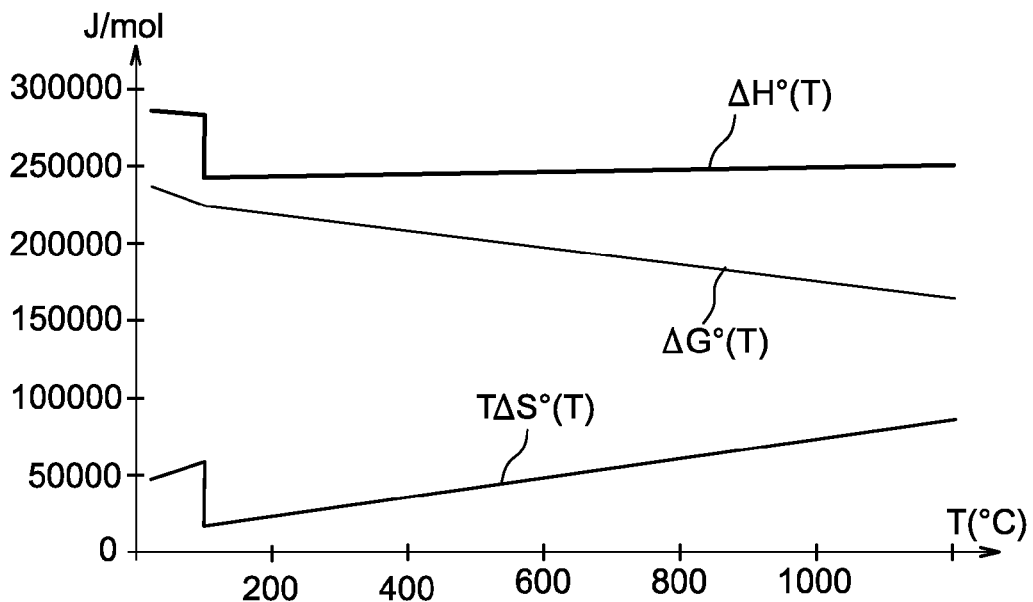
Figure 18:
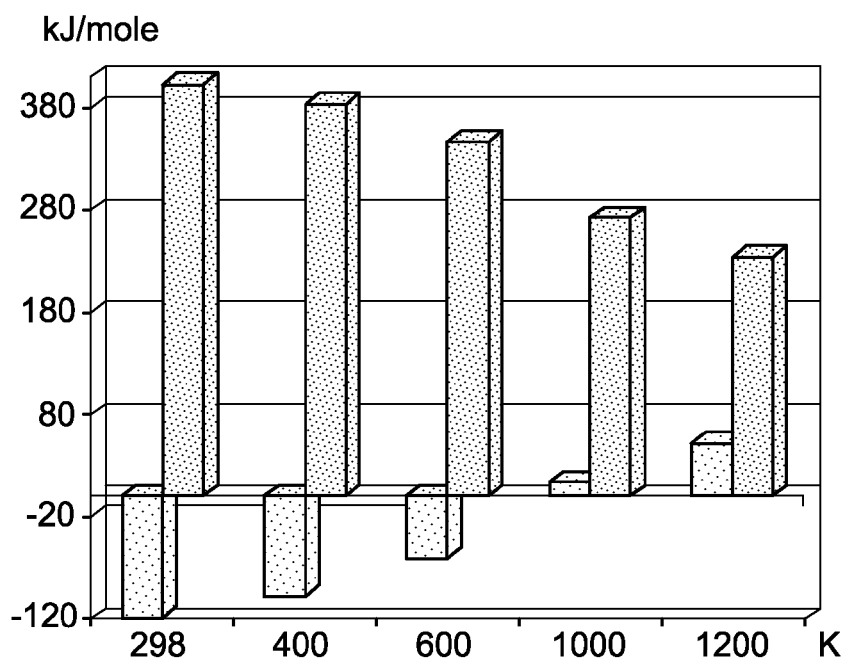
Figure 19:
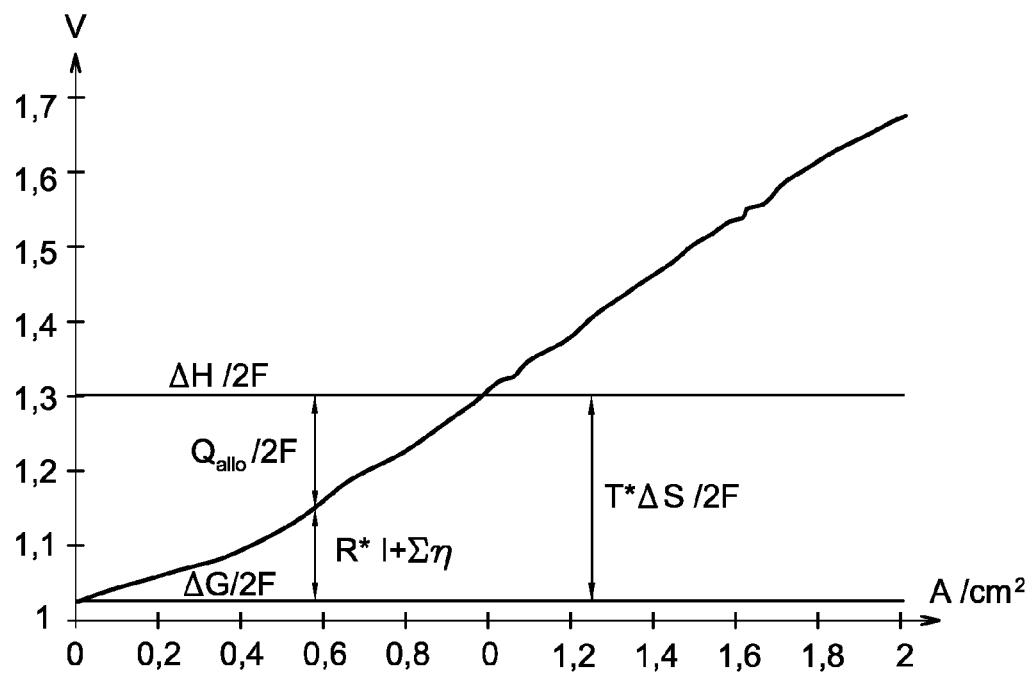
Figure 20:
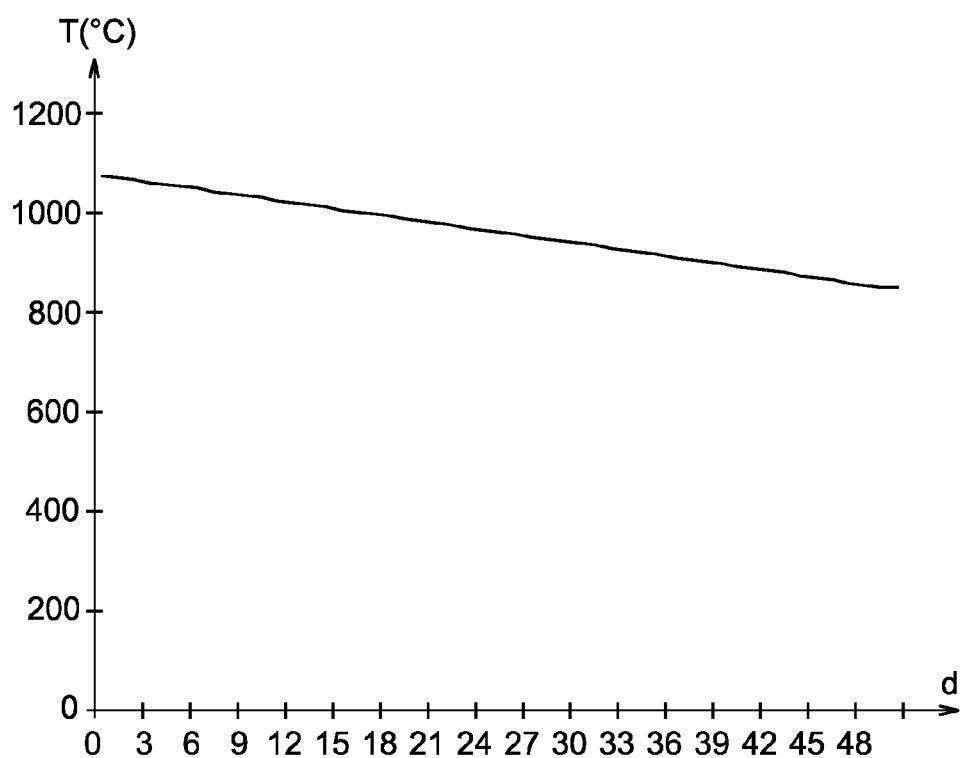

The present invention will be better understood with the description which follows and appended drawings, wherein:

FIG. 1A is a schematic illustration of a chamber for collecting generated hydrogen and for supplying a hot heat transfer fluid to an electrolyzer according to the present invention, FIG. 1B is a schematic illustration of a chamber for feeding the electrolyzer and for collecting the cold heat transfer fluid for an electrolyzer according to the present invention, FIGS. 2A and 2B respectively illustrate perspective views of a central body of an electrolysis plate in an intermediate state according to the present invention, FIG. 3 is a perspective view of the complete central body, FIG. 4 is a longitudinal sectional view of the central body, FIG. 5 is a perspective view of a frame intended to surround the central body in order to form the electrolysis plate, FIG. 6 is a perspective view of the electrolysis plate, FIGS. 7A and 7B are transverse sectional views of an electrolyzer according to the invention at an electrolysis plate, FIGS. 8A-8C respectively illustrate front, transverse sectional and longitudinal sectional views of a heating plate for an electrolyzer according to the present invention, FIG. 9 is a transverse sectional view of an electrolyzer according to the invention at a heating plate, FIG. 10 is a front view of an inner face of a sidewall of the electrolyzer bearing slides intended for receiving the side edges of the electrolysis plates and of the heating plates, FIG. 11 is a top view of the electrolyzer in the case of a connection of electrolysis plates in series, FIGS. 12A-12C respectively are bottom, longitudinal sectional and top views of a connecting plate for the connection on the upper chamber, FIG. 13 is a bottom view of a connecting plate mounted on the lower chamber, FIGS. 14A and 14B are schematic illustrations of the electric connections of the electrolysis plates in the case of a parallel connection by subgroups, FIG. 15 illustrates a distribution of the temperature values of a water/hydrogen mixture and of the heat transfer fluid along an electrolysis plate of an electrolyzer according to the present invention in a co-current operating mode, FIGS. 16A and 16B illustrate two cases of distribution of the temperature values of a water/hydrogen mixture and of the heat transfer fluid along an electrolysis plate of an electrolyzer according to the present invention in a counter-current operating mode, FIG. 17 illustrates the thermodynamic functions of the water dissociation reaction, FIG. 18 illustrates the heat/electricity distribution versus temperature for present electrolyzers as a bar graph, FIG. 19 illustrates an exemplary electrolyzer characteristic, on which may be seen the change in the potential versus the current density, FIG. 20 illustrates the temperature distribution curve of the mixture in the electrolyzer without any integrated heating in the case of an electrolyzer with allothermal operation from the state of the art.

DETAILED DISCUSSION OF PARTICULAR EMBODIMENTS

By way of illustration, different operating schedules will be described of a high temperature, elementary water electrolysis cell consisting of an anode supplied by an electric current I, a cathode and an electrolyte. These different parts are formed of ceramic material.

The water decomposition reaction is an endothermal conversion, the Gibbs-Helmholtz equation showing that the variation in free enthalpy of a reagent-product mixture during an endothermal reaction decreases with the reaction temperature, which more schematically means that the higher the temperature of the water vapour, hydrogen mixture and formed oxygen, the smaller the part of electric energy required for decomposition of the water molecules, and the higher the part of thermal energy required to maintain the mixture at constant temperature.

The values as a function of temperature of $\Delta G°$, $\Delta H°$ and $T*\Delta S°$, ($\Delta H°$ being the total energy demand $\Delta H°=T*\Delta S°+\Delta G°$) for decomposition of one mole of water under a pressure of 1 bar (standard conditions) are given by the curves $\Delta G°$, $\Delta H°$, $T*\Delta S°$ respectively in the graph shown FIG. 21 with, at saturation temperature, a decrease in $T*\Delta S°$ equal to the vaporization heat for one mole of water.

In the area concerned by the invention i.e. in vapour phase, the values of $\Delta H°$ and $\Delta S°$ are practically constant and the thermal energy which can be provided on decomposition of one mole of water vapour, represented by the product of entropy by temperature $T*\Delta S°$, is proportional to temperature. The term $\Delta G°$ (T) representing the electric energy demand for conversion of pure bodies at temperature T then decreases linearly with temperature.

Under these conditions, the global electrolysis reaction of one mole of water in vapour phase at temperature T and total pressure P is considered to be:

$$H_2O(g) \rightarrow H_2(g) + \tfrac{1}{2}O_2(g) \qquad (1).$$

This reaction is accompanied by a variation in free enthalpy $\Delta G$.

If, for simplification purposes, Raoult's law is assumed for mixtures of perfect gases, the variation in free enthalpy $\Delta G$ representing the electric energy demand for decomposition of one mole of water in vapour form is written:

$$\Delta G(T,P) = \Delta G°(T,P_0) + RT*\mathrm{Ln}\,(P_{H2}*P_{O2}^{1/2}/P_{H2O}),$$

in which $\Delta G°$ (T) is Gibbs' standard variation in free enthalpy at temperature T under $P_0=1$ bar.

$P_{H2}$, $P_{O2}$ are the partial pressures of the gases, in bars;

$P_{H2O}$ is the partial pressure of the water water vapour, in bars;

T is the temperature, in K;

R is the constant of perfect gases (8,314 J.mol$^{-1}$ K$^{-1}$).

$\Delta G$ represents the energy to be provided to decompose one mole of water vapour at temperature T under total pressure P.

$2F*E$ is the electric energy provided at the time of changeover from zero reference potential to potential E of a charge of 2F (F being the Faraday number: absolute value of the charge of one mole of electrons i.e. 96485 C).

The absolute value of the equilibrium potential (at zero current) is therefore written:

$$E_{i=0} = \Delta G/2F.$$

Therefore according to Nernst's law:

$$E_{i=0} = E° + (RT/2F)*\mathrm{Ln}\,(P_{H2}*P_{O2}^{1/2}/P_{H2O}).$$

E° being equal to $\Delta G°/2F$.

In a closed circuit, the voltage to be applied to the terminals of the electrolysis is greater than the reversible voltage $E_{i=0}$ given by Nernst's law. With the setting up of a current of intensity I in the different constituent parts of the cell, numerous phenomena of irreversibility occur.

The chief phenomena are:

the resistances ($R_{ohmic}$) against passing of current in the materials forming the electrolysis plate and interconnections, which cause ohmic drops; one of the loss factors is related to the solid electrolyte, the electrode overvoltages ($\eta$) related to activation of elementary reactions at the electrode-gas interfaces and to diffusion of the gases in the electrodes.

The voltage to be applied to the terminals of the electrolysis cell is therefore written:

$$E = E_{i=0} + R_{ohmic}*I + \Sigma\eta.$$

Or:

$$E = E° + (RT/2F)*\text{Ln}\,(P_{H2}*P_{O2}^{1/2}/P_{H2O}) + R_{ohmic}* + \Sigma\eta.$$

The values of ohmic resistances and overvoltages depend on the physical characteristics of the electrolysers, they decrease with operating temperature.

As already indicated previously, for present-day equipment below a temperature threshold in the order of 750° C. (as can be seen FIG. 22) the quantity of heat generated by Joule effect, due to electric supply to the electrolysis cells, is greater than the heat consumed by the electrolysis reaction, the functioning of the assembly is therefore exothermal.

Current technological developments, notably in the choice of materials and reduction in electrode and electrolyte thickness having regard to mechanical resistance constraints, tend to lower the temperature threshold on and after which the electrolyser operates in endothermal mode.

During electrolysis, a quantity of energy corresponding to the entropic part T*ΔS must be supplied to the process in the form of heat. Part of this heat is produced by Joule effect within the electrolyser, depending on the current intensity I passing through the electrolysis cell:

If:

$$R_{ohmic}*I^2 + \Sigma\eta*I > T*\Delta S*I/2F,$$

the electrolyser produces too much heat, it is in exothermal mode, in which case maintaining the reagents and products at constant temperature requires evacuation of the heat towards a cold source.

If:

$$R_{ohmic}*I^2 + \Sigma\eta*I = T*\Delta S*I/2F$$

the electrolyser produces sufficient heat, it is in thermal equilibrium and maintaining the temperature of the reagents and products does not require an external heat source, the electrolyser is therefore in autothermal mode i.e. without any external heat source.

If:

$$R_{ohmic}*I^2 + \Sigma\eta*I < T*\Delta S*I/2F,$$

the heat produced by the electrolyser is not sufficient to maintain the water decomposition reaction in thermal equilibrium, the electrolyze is in endothermal mode, the supply of heat from an external heat source being necessary to maintain constant temperature. The operating mode is then autothermal.

As an example, FIG. 19 shows the calculated trend in potential E ($E = E_{i=0} + R_{ohmic}*I + \Sigma\eta$) shown as V, as function of current density $D_c$ on an electrolysis plate (ratio I/S in A/cm2 in which I is the intensity of the current supplied to the plate at A and S is the anode/electrolyte/cathode surface area in cm2) for a total pressure of 30 bars, a temperature of 900° C., a mean of the ratio H2/H2O fixed at 0.5 and an electrolyte thickness of 30 μm.

Above the potential V1 of value ΔH/2F, the functioning mode is exothermal.

The potential V2 of value ΔG/2F is the minimum potential required for electrolysis.

Between the potentials V1 and V2, the functioning mode is endothermal.

In the example of an electrolysis plate whose characteristic is shown FIG. 19, the current density value is 0.99 A·cm$^{-2}$, corresponding to the particular point of thermal equilibrium. Above this point, hydrogen will be produced in exothermal mode.

Endothermal functioning of the electrolysis plate in this case lies within the range of current density of 0 A·cm$^{-2}$ to 0.98 A·cm$^{-2}$, the overvoltages and ohmic losses Δelec do not produce enough heat, therefore for each mole of decomposed water a quantity of heat $Q_{allo}$ from an external source needs to be provided.

The electrolyser according to the present invention permits electrolysis with endothermal functioning under stable, homogeneous temperature conditions.

In FIGS. 1-13, we may see the different members of an exchanger-electrolyzer according to the present invention with an electric power supply of the electrolysis plates in series.

In the continuation of the description, we shall designate the exchanger-electrolyzer by electrolyzer for the sake of simplicity.

As this may be seen in FIGS. 7A and 7B, the electrolyzer includes an upper chamber 2 forming a chamber for collecting produced dihydrogen H$_2$, of a middle box 4 and of lower chamber 6 forming a water vapour supply chamber. These three elements may be welded together or assembled with brackets 7 in order to form a sealed metal enclosure with a shape close to a rectangular parallelepiped filled in majority with high pressure water vapour, i.e. a pressure of several tens of bars. Advantageously, these pressures correspond to the storage and transport pressures of a produced gas, in order to limit the subsequent compression steps. These pressures are for example comprised between 30 bars and 130 bars, or even beyond.

The enclosure may be for example made in 800H stainless steel or in Hastelloy with a determined thickness, for example of the order of several centimeters. The thickness of the walls of the enclosure may be determined according to the pressure level following the "*Règles de Conception et de Construction des Matériels*" (rules for designing and building equipment).

Taking into account the simple shape of the electrolysis box, provision may be made for a lining in silicon carbide (SiC) of the internal walls of one or more centimeters for protecting the mechanical casing against corrosion phenomena and for slightly lowering the temperature of the mechanical wall. Refractory glass coating techniques may also be used for protecting the inner walls of the mechanical casing. The silicon carbide lining also contributes to limiting the heat losses of the apparatus.

According to the present invention, the electrolyzer also includes heating means, internal to the electrolyzer, using a heat transfer fluid. In the illustrated example, the heating means are formed by heating plates 10 positioned in alternation with the electrolysis plates 8 in the sealed enclosure.

The heat transfer fluid is intended to circulate in the heating plates 10 in order to heat the fluid contained in the enclosure by heat exchange. The heat transfer fluid is brought to a high temperature by an outer heat source, for example of the boiler or heat exchanger type.

The heat transfer fluid may be in a liquid phase, i.e. molten metal or salt or a gas phase. The heat transfer fluid may also be a gas under high pressure, for example helium. The heat transfer fluid may be of nature different from that of the fluid intended to undergo the electrolysis and/or from the products of the electrolysis.

The electrical power supply of the electrolysis plates is effected at the upper 2 and lower 6 chambers.

In the following description, we shall describe in details each of the components of the electrolyzer.

The upper chamber 2 is in the shape of an open case, the upper face 9 of which includes a first recess 11 provided with a plurality of apertures 13 aligned for letting through end pieces of the heating plates, covered by a conduit for distributing the hot transfer fluid 14, sealably attached or welded onto the upper face 9.

The upper surface 9 includes a second recess 12 provided with a plurality of apertures 15 for letting through the end pieces for collecting oxygen from the electrolyzer plates 8 covered by an upper conduit for collecting oxygen 16, the latter being sealably attached or welded onto the upper face 9.

Advantageously, a cooling channel 18 for the upper electric connections is also sealably attached or welded in the second recess 12, covering a plurality of apertures 19 for letting through the anode or cathode pins of the supply plates.

The upper chamber 2 also includes a main conduit 20 for the outflow of the water vapour/hydrogen mixture formed in the electrolyzer-exchanger.

The middle box 4 includes a metal casing with an open parallelepipedal shape with slides 22, 24 on two opposite faces, as illustrated in FIG. 10 into which are inserted the electrolysis plates 8 in alternation with heating plates, respectively.

The lower chamber 6 has a shape very close to that of the upper chamber 2. It has the shape of open casing, the lower face of which 26 also includes a recess 28 provided with a series of apertures 29 for letting through the end pieces for collecting the cold fluid, these apertures 29 being covered by a conduit 30 for collecting the cold heat transfer fluid, welded onto the recess 28, and another recess 32 including apertures 33 for letting through the end pieces for collecting oxygen, covered by a lower conduit 34 for collecting oxygen, sealably attached or welded onto the recess 32.

A channel 36 for cooling the lower electric connections is also advantageously provided above apertures 35 for letting through the anode and/or cathode pins and is welded onto the recess 32. The lower chamber 2 also includes a main pressurized water vapour supply conduit 38.

In the illustrated example, electric powering of the electrolysis plates by the electric power source is accomplished with metal braids located in the cooling channels 18, 36 with which it is possible to obtain very good electric conductivity of the metal conductors. Further, the electric connections take place on the outside of the electrolyzer and are therefore not subject to the high temperature in the electrolyzer.

We shall now describe an electrolysis plate 8 according to the invention; the latter includes a central body 8.1 and a frame 8.2.

Generally, the central body 8.1 according to the invention is laminated, i.e. it is formed with a superposition of layers. These layers are particularly visible on the longitudinal sectional view of an electrolysis plate of FIG. 4.

The central body 8.1 according to the invention includes a rigid core 40, covered by an anode 42 on both of its main faces, by an electrolyte 44 covering the anode and by a cathode 46 covering the electrolyte 44.

The core 40 is advantageously metal for conducting the current; it may also be made in a high density and electrically conducting ceramic material, for example with the material used for making the anode but at a very high density. It substantially has a rectangular shape of a few millimeters thick and includes at a longitudinal end a thicker head 48, for example of the order of one to two centimeters thick, with which is integral an anode pin 50, the anode pin 50 being intended for connecting the anode 42 to the electric power supply.

The core 40 advantageously includes means 52 for draining the oxygen generated at the anode 42. These draining means 52 are formed, in the illustrated example, by grooves 54 made in each face of the core and with reservoirs 56, as this may be seen in FIG. 2A. The reservoirs 56 are broken down into intermediate reservoirs 56.1 collecting the oxygen at different locations of the anode and of a main reservoir 56.2 connected to all the intermediate reservoirs 56.1 through grooves 54 and directly connected to an oxygen collector.

The grooves 54 and the reservoirs 56.1, 56.2 are filled with a porous material which is a good electric conductor, for example metal foam in order to allow deposition of the anode-forming layer on the faces of the metal core.

The grooves 54 are made on the faces of the core so as to ensure effective collection of the oxygen in a uniform way. The latter have variable dimensions depending on their length and on their positioning on the plate.

The main reservoir 56.2, as this may be seen in FIG. 4, is formed by a through-recess filled with metal foam. The latter is connected to a nozzle of an end piece 58 for collecting oxygen through a bore 60 made longitudinally in the metal core.

The anode 42 is of the porous ceramic anode type and a very good conductor of electricity, for example in lanthanum manganite doped with strontium or an equivalent material. The latter is deposited as a thin layer, of the order of a tenth of a millimeter. In FIG. 2B, the metal core 40 may be seen covered with the anode 42.

The electrolyte 44 is sealed and is an electric insulator and good ion conductor, for example it is made in stabilized zirconia deposited as a very thin layer, for example of the order of 40 μm on the anode 42. The electrolyte is deposited in a thicker layer on the portion of the metal core 40 not covered by the anode, in order to produce a continuous planar surface.

The cathode 46 is for example in metal ceramic, in nickel, in stabilized zirconia. The latter is deposited as a thin layer of the order of a tenth of a millimeter on the electrolyte 44.

As we have indicated earlier, the electrolysis plate 8 includes a metal end piece 58 which connects to the main reservoir 56.2.

This end piece 58 may for example be brazed on a metal support 62 applied against the head of the metal core 40 by means of electrically insulated screws, an electric insulation and seal gasket 64 being provided between the head of the core 40 and the support 62.

This end piece 58 may also be directly brazed on the head of the core 40, which allows suppression of the gasket 64. In this case, electric insulation is provided at the outlet of the electrolyzer. The complete central body 8.1 of the complete electrolysis plate may be seen In FIG. 3.

In FIG. 5, the frame 8.2 may be seen, formed with two metal half-shells 66 intended to come on either side of the central body 8.1 and with a closure/tightening system 68, in order to compress the central body 8.1 between both half-shells 66. The thereby produced compression participates in the stiffness and seal of the electrolysis plate.

Further, the frame 8.2 is an electric conductor, for example in metal, and continuously ensures the electric connection between the cathode 46 and a cathode pin 70 borne by the frame 8.2. The cathode pin 70 is provided so as to be axially opposite to the anode pin 50. An electric insulation gasket 72 is provided between the head of the metal core 40 and the frame 8.2 and between the flanks of the central body 8.1 and the metal frame 8.2. By using the frame 8.2 for connecting the cathode to the cathode pin 70, it is possible to avoid resorting to connecting cables.

The tightening means for example are of the screw-nut type mounted inside brackets 74 of the half-shells 66, these brackets also form the guides intended to be received in the slides 22 of the middle box 4 of the electrolyzer.

The slides 22 are also provided with electric insulating means 75 for insulating the cathode from the box and for avoiding a short circuit.

It should be noted that operating with a high water vapour pressure very strongly and continuously flattens the different layers forming the central body 8.1 of the electrolysis plate against each other, which ensures performing operation of the electrolysis plates 8.

As the pressure of the water vapour/hydrogen mixture is much higher than the pressure of the oxygen collected by the draining means, the higher the pressure of the water vapour/hydrogen mixture contained in the electrolysis enclosure, the more the cathode 46 is strongly and continuously flattened on the electrolyte 44, the electrolyte 44 on the anode 42 and the anode 42 on the metal core 40, and therefore the better are the electric contacts between these different members. This therefore promotes the obtaining of high performances constant over time for this type of electrolyzer.

Therefore, when the expression of the voltage to be applied to the electrolysis is taken up again, the irreversibility term is formed with an ohmic loss term and an activation overvoltage term $\Sigma\eta$. Now, at temperatures above 800° C. at which the electrolyzer according to the present invention operates, the water dissociation reaction is activated by temperature, it therefore only requires a very low activation overvoltage $\Sigma\eta$, the total voltage on the terminals of the electrolysis cell is then substantially reduced to the sum of the voltage at zero current and of the ohmic drop, which varies linearly with the current density. Therefore, by flattening the electrolyte on the anode and the anode on the metal core, the ohmic drop term is reduced, the irreversibility term is therefore reduced, which allows operation with high endothermicity. Reduction of the ohmic losses is also obtained by maintaining the strong intensity electric ducts outside the enclosure in order to keep them at a low temperature.

The present invention also has the advantage of simplifying the making of seals between the oxygen conduits and the conduits containing hydrogen and of making them more efficient. Indeed, by maintaining a sufficient water vapour flow, relatively to the formed hydrogen flow, and by maintaining a homogeneous water vapour/hydrogen mixture, the seal gaskets are subject at the electrolysis plates to the external overpressure of the homogeneous hydrogen-containing water vapour mixture, and not to internal overpressure, the seals are therefore easier to produce. The electrolyzer therefore has an increased service life.

We shall now describe a heating plate 10 according to the invention illustrated in FIGS. 8A-8C.

The heating plate includes two metal sheets 76, for example in 800H steel or in Hastelloy, stamped and welded on their entire periphery.

Between two metal sheets 76, a heat exchange body 78 is positioned including one or several hundred channels extending longitudinally between an upper end 10.1 and a lower end 10.2, in which the heat transfer fluid will circulate.

A manifold 80 for admitting the hot heat transfer fluid is provided at the upper end and a manifold 82 for discharging the cold heat transfer fluid is provided at the lower end.

End pieces 84, 86 are provided on the admission 80 and discharge 82 manifolds, advantageously these end pieces 84, 86 are metal, brazed on the manifolds 80, 82.

Moreover, two guides 85 are provided on the lateral sides of the heating plate 10 in order to penetrate into the slides 24 of the middle box 4.

We shall now describe the assembling of the different members making up the electrolyzer according to the invention in the case of a mounting in series of the electrolysis plates 8.

First of all we shall refer to FIG. 7A.

The lower chamber 6 is attached onto the middle box 4. The electrolysis plate 8 is then inserted into the middle box 4 by sliding its bracket in the slides 22.

The cathode pin 70 penetrates into the aperture 35 made for this purpose in the lower chamber 6 in the cooling channel 36.

The heating plate 10 is then inserted into the adjacent slides 24 as this may be seen in FIG. 9, the end piece 86 for the outflow of the cold heat transfer fluid passes through the aperture 29 provided in the lower chamber 6.

Next, another electrolysis plate 8 is introduced into the middle box 4, this time in such a way that the anode pin 50 passes through an aperture 35, as this is illustrated in FIG. 7B. An end piece for collecting oxygen 58 then also passes through an orifice 33 opening out into the channel for collecting oxygen 34.

Next, a new heating plate 10 is introduced adjacently and in the same way as the previous heating plate and so forth until the box is filled.

It should be noted that the electrolysis plates 8 are introduced alternately with the anode pin 50 pointing upwards and downwards, so that the length of the electric connections may be reduced as this will be seen subsequently, and only identical electrolysis plates may be used.

The upper chamber 2 is then positioned on the middle box 4 so that the anode pins 50 pass through the apertures 19, the end pieces for collecting oxygen 58 pass through the apertures 15 and the end pieces 84 for supplying hot heat transfer fluid pass through the apertures 13.

The upper chamber 2 is attached onto the middle box 4.

The hot heat transfer fluid conduit 14 is connected to a hot heat transfer fluid source, the conduit for collecting oxygen 16 is connected to a reservoir for storing oxygen, the main conduit 20 is connected to a reservoir for recovering the water/hydrogen mixture.

The admission end pieces 84 are brazed on the upper face of the recess 11 of the upper chamber, they are thereby connected to the hot heat transfer fluid channel. With brazing, it is possible to avoid resorting to additional sealing means, therefore the service life of the electrolyzer is increased.

The anode 50 and cathode 70 pins opening out from the upper chamber 2 are connected as illustrated in FIG. 11, a cooling channel 18 having been omitted. This electric connection allows a mounting in series of the electrolysis plates 8 without resorting to cables running along the plates.

The recesses in the upper 2 and lower 6 chambers have the advantage of reducing the required length of the anode and cathode pins and thus reducing the losses by the Joule effect.

Provision is advantageously made for positioning a connecting plate 88 illustrated in FIGS. 12A-12C crossed by the anode 50 and cathode 70 pins.

In the case of a mounting in series, this connecting plate 88 is made in ceramic in order to insulate the anode and/or cathode pins for avoiding a short circuit.

For example it has a thickness from one to several centimeters depending on the pressure level in the electrolyzer and its seal gasket ensures the seal and electric insulation of the connections with regard to the electrolysis box.

The connecting plate 88 includes a series of aligned bores 90 for letting through the anode pins 50 and the cathode pins 70. Moreover, the plate 88 includes on its periphery, bores 92 for letting through tightening studs 94 for its attachment onto the upper chamber 2 and compression of the seal gasket (not shown).

In FIG. 12B, illustrating a longitudinal section of the plate 88, it may be seen that each bore 90 includes a seal gasket 96. In FIG. 12C, the plate 88 may be seen with the series connection of the electrolysis plates.

A seal gasket (not shown) is provided in the lower face of the connecting plate 88 and the outer surface of the upper chamber.

The anode pin 50.1 of the first electrolysis plate 8 is connected to the electric power supply (not shown), the cathode pin 70.1 of the second electrolysis plate 8 is connected the anode pin 50.1 and so forth.

In FIG. 13, a seal plate 98 may be seen, similar to the plate 88 for the electric connections on the outer face of the lower chamber 6.

In the case of a mounting in parallel, these connecting plates 88, 98 may be metal, more generally in an electrically conducting material; the pins may then be directly brazed on the connecting plates 88, 98.

Further, in the described example, the anode and cathode pins are of a rectangular section, however provision may be made for having them have a circular section allowing them to be connected to connecting cables by cable clips.

In the illustrated example, the connecting plates are of one single piece, but it may be provided that the latter be in several portions.

The connecting plates 88, 98 provided with their seal gasket 89 are slid on the pins 50, 70 of the electrolysis plates and then screwed onto the upper and lower chambers.

The pins 50, 70 are brazed in their housing; the conduits 14, 30 for the heat transfer fluid flow are crimped or brazed in order to form the distributing and collecting channels as well as the oxygen conduits 16, 34.

The channels for circulating the hot and cold heat transfer fluid, for discharging oxygen and for cooling the electric contacters are mounted on their respective conduits.

The electrolyzer is intended to operate under high or very high pressure. For this the electrolyzer includes an enclosure capable of maintaining an electrolyte gas under high or very high pressure of several tens of bars.

This high pressure or even very high pressure operation is made possible by the present invention, since the mechanical stresses are absorbed in a large proportion by the metal confinement enclosure. The other mechanical members, notably the electrolysis plates, are as for them subject to much smaller mechanical stresses. Therefore, the dimensioning constraints mainly deal with the enclosure and not with the other members of the electrolyzer. Moreover, the electrolysis plates work in compression since the formed gases which they contain are at a lower pressure than the gas in which they are immersed, as this has already been described.

The heating plates also work in compression in the case when the pressure of the heat transfer fluid is less than that of the electrolyte gas, for example in the case of heat transfer fluids of the liquid metal or molten salt type, or with low tensile stresses if the pressure of the heat transfer fluid is of the same level or slightly greater than that of the electrolyte gas.

With this, it is possible to directly obtain production under very high pressure of several tens of bars, of gases produced from electrolysis, which allows reduction of the compression level required for storing and transporting the gases produced by the electrolysis installation, storage and transport pressures are presently in the range from 30 to 130 bars for hydrogen. Compression of the gases requires electric compressors downstream from the electrolyzer, which consume a lot of energy.

With this, it is also possible to reduce the flow velocities of the electrolysis gas between the different plates therefore the pressure drops in the electrolyzer. With this, it is also possible to obtain for large values of the production capacity of the installation, acceptable dimensions of the production unit while maintaining values of pressure drops in the gas flows, which go in the direction of reducing electric consumption of the means for raising the pressure in the circuits.

Moreover, the electrolyzer according to the invention allows operation at high or even very high pressure, of the different stages of a production factory with as only piece of compression equipment, pumps of the supply stage of the factory, for supplying fluid to be electrolyzed. With this, the different installations of the factory may be made more compact and electricity consumption of the factory may be reduced by reducing or even by canceling the number of required compressors and by reducing the capacity of the means for raising pressure in the circuits because of the reduction in pressure drops.

As an example, an electrolyzer according to the invention may include 58 electrolysis plates and 59 heating plates.

An electrolysis plate for example has a width of 0.16 m, a height of 0.38 m and a thickness of the 0.0133 m. The active portion of a cathode may then form a rectangle with a height of 0.35 m and a width of 0.119 m.

The heating plates 10 have dimensions similar to the electrolysis plates 8 in height and in width, the channels may have an equivalent internal hydraulic diameter of 0.004 m, the thickness of the metal sheets being 0.001 m, the latter may be small because there is no pressure difference between the heat transfer gas and water vapour, which gives the plate an external thickness of 0.006 m.

The gap between the heating plate and the electrolysis plate is 0.003 m.

The internal dimensions of the middle box are then the following:
height: 0.38 m,
width: 0.16 m,
length: 1.48 m.

This electrolyzer allows generation of 0.05 mol/s of hydrogen i.e. 4.320 $Nm^3$/h.

The heat transfer fluid and the water vapour/hydrogen mixture may flow as a co-current, the inflow of the hot transfer fluid takes place through the bottom of the same side as the water vapour/hydrogen mixture, or as counter-currents, the inflow of the hot transfer fluid then taking place through the top as in the case illustrated in FIGS. 7A and 7B and 9, on the side opposite to the inflow of the water vapour/hydrogen mixture.

By mounting in series the electrolysis plates, it is possible to reduce the power supply intensity, and therefore the size of the supply braid and consequently the losses by the Joule effect.

In another embodiment, provision may be made for connecting in parallel the electrolysis plates.

According to a first alternative, all the electrolysis plates may be mounted in parallel. With this mounting it is possible to directly braze the anode and cathode pins on the connecting plates.

According to another alternative, provision is made for making groups of electrolysis plates connected in series, the groups being themselves connected in parallel. This mounting in parallel allows adjustment of the potential difference on the terminals of the electrolyzer depending on that available on the electric mains. Indeed, it is possible to group a determined number of electrolysis plates in order to connect them according to a parallel mounting configuration in order to form connecting groups G1, G2 in parallel, and then connecting these groups together according to a series mounting configuration.

For this, during the mounting of the electrolysis plates in the middle box 4, it is sufficient to put all the plates of a connecting group G1 parallel in the same direction, for example with the anode pin 50 pointing upwards, and then those of the following connecting group G2 pointing in the opposite direction, the anode pin 50 pointing downwards and to finally make the electric connections according to the connection diagrams illustrated in FIGS. 14A (connection on the upper chamber 2) and 14B (connection on the lower chamber 6).

The electrolyzer according to the present invention advantageously lends itself to this type of mounting configuration, since the only electrically conducting members withstanding the total intensity of the connecting group are external metal braids which operate at low temperature and for which the section may be calculated accordingly.

The electrolysis plate according to the invention has the advantage of allowing mounting in series or in parallel without requiring modification of the latter, the direction of insertion of the electrolysis plates is sufficient for allowing a connection in series or in parallel.

We shall now give an example for the dimensioning of an electrolyzer according to the present invention, in the case when the reagent to be broken down is water vapour overheated to a temperature of 850° C. under a pressure of 30 bars. At this temperature value, the total amount of energy required for dissociating a mole of water (and to form a mole of hydrogen) is of the order of 247.2 kJ/mol, including an amount of electric energy 167.2 kJ/mol and an amount of heat of 80 kJ/mol. For a current density of 2000 A/$m^2$, the potential difference between electrodes is of the order of 1.06 volts, the heat generated by the passage of the electric current through the electrodes and the passage of the $O^{2-}$ ions through the electrolyte is of the order of 37.4 kJ/mol. It is therefore possible to provide an energy of 42.6 kJ/mol directly as heat provided by a heat transfer fluid flowing in the heating plates.

The example described above is only an operating point, it is possible to increase the partial pressure of hydrogen by reducing the water supply flow rate.

The selected heat transfer fluid is helium at a temperature of 900° C. under a pressure of 30 bars.

In order to guarantee the covering of the electrolysis plates with water vapour, the selected value of the water supply flow rate is five times greater than the value of the produced hydrogen flow rate, i.e. a water vapour supply flow rate of 0.25 mol/s for the unit.

In particular, a water vapour/produced hydrogen molar flow rate ratio will be sought in the range from 2-5, in order to obtain a high partial vapor pressure of hydrogen while ensuring proper covering of the electrolysis plates with water vapour.

The useful width of the electrolysis plates is set to 0.119 m and their height to 0.35 m, the anode and cathode surface area per plate is then 0.0833 $m^2$. With a current density of 2000 A/$m^2$, the current required for one plate is 0.1663 kA under a voltage of 1.06V. The high value of the intensity leads to a large thickness of the metal anode support (0.8 cm) in order to limit its electric resistance and the evolved heat.

The number of electrolysis plates is then 58 and the number of heating plates in then 59.

The production of such an electrolyzer is 0.05 mol/s, i.e. 4.32 $Nm^3$/hour.

An electrolysis plate has an overall thickness of 0.0133 m

The space between a heating plate and an electrolysis plate (gap) is selected to be equal to 0.003 m.

A heating plate has a thickness of 0.006 m.

The middle block has a length of 1.48 m, a height of 0.38 m and a width of 0.16 m. The internal dimensions of the chambers 2, 6 are: a width of 0.16 m and a length of 1.48 m with a depth of several tens of centimeters with which proper distribution and collection of water vapour and of the water vapour/hydrogen mixture may be ensured.

Concerning the heat transfer fluid, it is sought to obtain an inlet/outlet temperature change of the order of 35°; the total helium flow rate for providing the amount of heat required for dissociating 0.05 mol/s of water vapour is 3 mol/s.

We shall now describe a numerical simulation of the thermics of the permanent operation, showing the efficiency of the present invention, in particular the slight temperature changes and the distribution homogeneity of temperature within the electrolyzer, in particular along the electrolysis plates.

The thermochemical code for calculating the flow of the reagent between the heating plates and electrolysis plates takes into account the reaction enthalpy required for each dissociation of a water molecule in contact with a cathode on the one hand and the heat exchanges through the walls of the heating plates with the heat transfer fluid on the other hand.

Graphical illustrations of the temperature values of the water vapour/hydrogen mixture in ° C. in solid lines in the direction of its flow along a cathode in cm, and of the helium, in dashed lines, used as a heat transfer fluid, are illustrated In FIG. 15.

At the inlet of the electrolysis box, the water vapour flow rate is 0.25 mol/s for a temperature of 850° C. and a pressure of 30 bars.

For the helium used as a heat transfer fluid, the value of the inlet temperature is 900° C. and the flow rate value is 3 mol/s.

The curves may be broken down into two areas:
  A relatively short area (with a length of 12 cm) in this case (low water vapour flow rate relatively to the helium heat transfer fluid flow rate) of overheating of water vapour. In this portion the heat provided by the heating plates is greater than the heat required for dissociating water molecules.
  An equilibrium or cooling area where the helium of the heating plates and the water/hydrogen mixture cool together with a slope, all the lower since the total heat inertia of the helium, water vapour and formed hydrogen system is higher.

It is seen on the curve of FIG. 15 that with a difference of only 50° C. between the temperature of the hot transfer fluid and the water vapour inflow temperature:
  the maximum change in the operating temperature of the electrolysis plate is less than 33° C.,
  the inflow and outflow temperature values of the mixture are substantially equal, with slight overheating upon outflow, the inflow temperature being 850° C. and the outflow temperature being 854° C. It is moreover possible to modulate this difference between the inlet and the outlet of the electrolyzer by increasing or decreasing the heat transfer fluid flow rate.

This curve shows the benefit of the device since it is possible to obtain homogeneous operation of an electrolysis plate with a low value of the reagent flow rate.

More generally, this device may be dimensioned so as to be particularly efficient in the case of electrolysis of gas with low mass heat capacity by using liquid or gas heat transfer fluids with high mass heat capacity value.

In FIGS. 16A and 16B, a graphical illustration of the temperature distribution in ° C. along a cathode, more generally of an electrolysis plate in cm, may be seen in the case of counter-current flow of the heat transfer fluid with respect to the water vapour/hydrogen mixture.

Two operating cases are possible:
an overheated water vapour/hydrogen mixture is desired at the outlet of the electrolyzer, this is the case of FIG. 16A where the same flow rate and the same inflow temperature of the heat transfer fluid are maintained. The overheating is then of the order of 40° C. which may be particularly interesting in the cases when the intention is to establish recycling of the water vapour;
a decrease of the temperature difference between the hot source and the set value of the stabilized operating temperature of he electrolyzer is desired, this is the case of FIG. 16B, where, with the same heat transfer fluid flow rate, an operating temperature is obtained in a range of 20° C. around the set value of 850° C. with a hot heat transfer fluid at only 879° C. These performances may be further improved by increasing the flow rate of the heat transfer fluid.

As a comparison, FIG. 20 shows the change in temperature of the water vapour/hydrogen mixture in the high temperature electrolyzer described in pages 7 and 8 as a function of the distance d along the cathode in centimeters with a water vapour molar flow rate value of five times the produced hydrogen flow rate, but in the absence of any integrated heating system.

It may be seen in this FIG. 20 that the change in temperature between the inlet and outlet of the electrolyzer is greater than 220° C. and that an inflow temperature of the mixture of 1075° C. is required for ensuring an outflow temperature value of 850° C.

As an example, by means of the invention with a boiler delivering a heat transfer fluid at 900° C., the whole electrolyzer may be maintained in a reduced high temperature range [850° C.-880° C.] with a water vapour flow rate of only five times the produced hydrogen flow rate while providing 42 kJ per produced hydrogen mole, as heat, i.e. a fifth of the consumed electric energy (204 kJ/mol H2, the remainder: 41 kJ/mol H2, is provided by the vaporization of water upstream from the electrolyzer by providing heat in a water vapour generator.

The electrolyzer according to the present invention has been described by using an example the electrolysis of water and the collection of oxygen, it is however well understood that the architecture of the electrolyzer according to the present invention may apply to the electrolysis of other gases and to the collection of any other gas.

The electrolyzer described above includes an active fluid supply from below, more generally in the axis of the plates, however a side supply may be provided in the middle box, so as to have a supply flow orthogonal to the electrolysis plates, which provides simplification of the design of the enclosure.

The invention claimed is:
1. An electrolyzer for high temperature electrolysis capable of operating in an allothermal mode, comprising:
an enclosure,
at least one electrolysis plate including an anode and a cathode in combination, and
means for heating an active fluid intended to undergo high temperature electrolysis with an operating temperature of at least 750° C.,
wherein the enclosure is capable of maintaining an electrolyte bath under high or very high pressure of several tens of bars, the electrolytic bath being formed by the active fluid, said means for heating is disposed in the enclosure and uses a heat transfer fluid, the active fluid is a gas, the means for heating includes at least one heating plate parallel and adjacent to the electrolysis plate, the heating plate substantially having a same size as the electrolysis plate and includes a metal casing in which a heat exchange body is disposed, including a plurality of channels extending between an end supplied with hot heat transfer fluid and an end connected to cold heat transfer fluid manifold, the heating plate is distinct from the electrolysis plate and not in contact with the electrolysis plate, and the electrolysis plate and the heating plate are immersed in the active fluid.

2. The high temperature electrolyzer according to claim 1, wherein the heat transfer fluid is a gas under high pressure.

3. The electrolyzer according to claim 1, wherein the heat transfer fluid is molten metal.

4. The electrolyzer according to claim 1, wherein the heat transfer fluid is formed by molten salts.

5. The high temperature electrolyzer according to claim 1, wherein the enclosure includes a lower chamber, a middle box, and an upper chamber.

6. The high temperature electrolyzer according to claim 5, wherein the electrolysis plate includes a central body formed by an electrically conducting core as a plate, covered on both faces of the central body by the anode, the anode covered with an electrolyte, the electrolyte covered by the cathode and an electrically conducting frame surrounding the central body and exerting a compressive force on layers forming the central body.

7. The high temperature electrolyzer according to claim 6, wherein an anode pin is connected to the core in order to connect the anode to a source of electric current and the cathode is electrically connected to the frame, which bears a cathode pin, the anode pin and the cathode pin being disposed at ends opposite to each other of the electrolysis plate.

8. The high temperature electrolyzer according to claim 6, including at least one channel made in the anode and a collecting end piece connected to the at least one channel for bringing a gas produced at the anode to an outside of the electrolyzer, the pressure of the gas produced at the anode being less than that of the electrolyte bath at the cathode, the anode, the electrolyte and the cathode being thereby pressed against each other.

9. The electrolyzer according to the claim 8, including channels formed by grooves made in the core and reservoirs, one of the reservoirs being connected to the collecting end piece, connected to a main manifold.

10. The high temperature electrolyzer according to claim 9, including a plurality of electrolysis plates and a plurality of heating plates, the heating plates being disposed between two electrolysis plates.

11. The high temperature electrolyzer according to claim 10, wherein the electrolysis plates are electrically connected in series, adjacent electrolysis plates being mounted in the enclosure so that an anode pin of an electrolysis plate passes through the lower chamber and an anode pin of an adjacent electrolysis plate passes through the upper chamber.

12. The high temperature electrolyzer according to claim 10, wherein the electrolysis plates are electrically connected in parallel.

13. The high temperature electrolyzer according to claim 10, wherein the electrolysis plates are distributed in groups electrically connected in parallel, the groups being connected together in series, the electrolysis plates of a same group being mounted in the middle box so that all the anode pins of these plates pass through the same lower or upper chambers, two adjacent groups having their anode pins not passing through the same chamber.

14. The high temperature electrolyzer according to claim 10, wherein the electrolysis plates are mounted in the enclosure by slides made on the middle box, an electric insulator being provided between the electrolysis plates and the slides, and wherein the heating plates are also mounted in slides provided on the middle box.

15. The high temperature electrolyzer according to claim 10, wherein the upper and lower chambers include apertures that let through end pieces for heat transfer fluid that collect the gas produced at the anode and anode and cathode pins and a main passage for the active fluid.

16. The high temperature electrolyzer according to claim 15, wherein the apertures that let through the anode and cathode pins are covered by a channel that cools electric connections.

17. The high temperature electrolyzer according to claim 15, wherein the apertures that let through the anode and cathode pins are disposed in a recess of the upper and lower chambers.

18. The high temperature electrolyzer according to claim 15, wherein a connecting plate is disposed around the anode and/or cathode pins on the upper chamber outside the upper chamber and a connecting plate is disposed around the anode and/or cathode pins on the lower chamber outside the lower chamber.

19. An installation for producing gas by electrolysis including:
    at least one electrolyzer according to claim 10,
    an electric power supply with a given voltage,
    wherein the electrolysis plates are grouped in several groups, the electrolysis plates being connected in series within a same group and the groups being connected in parallel, the number of electrolysis plates of each group being selected so that a voltage of each group of electrolysis plates is close to the given voltage of the electric power supply.

20. A method comprising:
    producing dihydrogen and dioxygen from water with an electrolyzer, the electrolyzer including
    an enclosure,
    at least one electrolysis plate including an anode and a cathode in combination, and
    means for heating an active fluid intended to undergo high temperature electrolysis with an operating temperature of at least 750° C.,
    wherein the enclosure is capable of maintaining an electrolyte bath under high or very high pressure of several tens of bars, the electrolytic bath being formed by the active fluid, said means for heating is disposed in the enclosure and uses a heat transfer fluid, the active fluid is a gas, the means for heating includes at least one heating plate disposed parallel and adjacent to the electrolysis plate, the heating plate substantially having a same size as the electrolysis plate and includes a metal casing in which a heat exchange body is disposed, including a plurality of channels extending between an end supplied with hot heat transfer fluid and an end connected to cold heat transfer fluid manifold, the heating plate is distinct from the electrolysis plate and not in contact with the electrolysis plate, and the electrolysis plate and the heating plate are immersed in the active fluid,
    wherein the pressure of the electrolysis bath is substantially equal to or greater than a storage and/or distribution pressure of dihydrogen or dioxygen.

21. The method according to claim 20, wherein a ratio between a water vapour molar flow rate and a produced dihydrogen molar flow rate has a value from 2 to 5.

22. The high temperature electrolyzer according to claim 1, wherein the heat transfer fluid is helium gas.

23. The electrolyzer according to claim 1, wherein the heat transfer fluid is molten zinc.

24. The method according to claim 20, wherein the pressure of the electrolysis bath is-between 30 bars and 130 bars.

* * * * *

UNITED STATES PATENT AND TRADEMARK OFFICE
CERTIFICATE OF CORRECTION

PATENT NO. : 8,652,308 B2  
APPLICATION NO. : 12/670909  
DATED : February 18, 2014  
INVENTOR(S) : Patrick Aujollet It is certified that error appears in the above-identified patent and that said Letters Patent is hereby corrected as shown below:

On the title page, Item (54) and in the Specification, Column 1, Lines 1-3, the Title is incorrect, it should read:

-- HIGH TEMPERATURE AND HIGH PRESSURE ELECTROLYZER WITH ALLOTHERMAL OPERATION --

Signed and Sealed this  
Twenty-seventh Day of May, 2014

Michelle K. Lee  
*Deputy Director of the United States Patent and Trademark Office*